(12) United States Patent
Chen et al.

(10) Patent No.: US 11,188,905 B2
(45) Date of Patent: Nov. 30, 2021

(54) INFORMATION IDENTIFICATION CODE-BASED INFORMATION AUTHENTICATION METHOD AND TERMINAL

(71) Applicant: TENCENT TECHNOLOGY (SHENZHEN) COMPANY LIMITED, Guangdong (CN)

(72) Inventors: Chong Chen, Shenzhen (CN); Xingxing Dai, Shenzhen (CN); Zhenquan Wu, Shenzhen (CN); Mao Tang, Shenzhen (CN); Lingyun Song, Shenzhen (CN); Hongyang Hu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 305 days.

(21) Appl. No.: 16/420,331

(22) Filed: May 23, 2019

(65) Prior Publication Data

US 2019/0279326 A1  Sep. 12, 2019

Related U.S. Application Data

(63) Continuation of application No. PCT/CN2018/073867, filed on Jan. 23, 2018.

(30) Foreign Application Priority Data

Jan. 25, 2017  (CN) .......................... 201710061391.1

(51) Int. Cl.
*G06Q 20/40* (2012.01)
*G06Q 20/38* (2012.01)
(Continued)

(52) U.S. Cl.
CPC ......... *G06Q 20/40* (2013.01); *G06Q 20/3829* (2013.01); *G06Q 50/26* (2013.01);
(Continued)

(58) Field of Classification Search
None
See application file for complete search history.

(56) References Cited

U.S. PATENT DOCUMENTS

| 2003/0164400 | A1* | 9/2003 | Boyd | G06Q 20/04 |
| | | | | 235/382 |
| 2012/0054491 | A1* | 3/2012 | Tippett | H04L 9/3213 |
| | | | | 713/168 |

(Continued)

FOREIGN PATENT DOCUMENTS

| AU | 2017100350 A4 * | 6/2017 |
| CN | 101364329 A | 2/2009 |

(Continued)

OTHER PUBLICATIONS

International Search Report of PCT/CN2018/073867 dated Apr. 18, 2018.

(Continued)

*Primary Examiner* — Jacob C. Coppola
(74) *Attorney, Agent, or Firm* — Sughrue Mion, PLLC

(57) ABSTRACT

Embodiments of the present invention disclose an information identification code-based information authentication method, a terminal, and a computer storage medium. The method includes: generating an information identification code, the information identification code carrying a first identifier used for representing a user identity and a second identifier used for representing a generation time of the information identification code; and initiating, by a first terminal, or receiving, from the first terminal, a first request according to the information identification code, to request (Continued)

a second terminal to perform identity authentication on the first terminal to satisfy a target requirement.

20 Claims, 8 Drawing Sheets

(51) Int. Cl.
*G06Q 50/26* (2012.01)
*G07B 15/02* (2011.01)
*H04L 9/30* (2006.01)
*H04L 9/32* (2006.01)
*G07B 11/00* (2006.01)
*G07B 15/04* (2006.01)
*G07C 9/20* (2020.01)
*G06Q 20/14* (2012.01)

(52) U.S. Cl.
CPC .............. *G07B 11/00* (2013.01); *G07B 15/02* (2013.01); *G07B 15/04* (2013.01); *G07C 9/20* (2020.01); *H04L 9/30* (2013.01); *H04L 9/3226* (2013.01); *G06Q 20/14* (2013.01); *G06Q 2220/00* (2013.01)

(56) References Cited

U.S. PATENT DOCUMENTS

| | | | | |
|---|---|---|---|---|
| 2012/0091202 | A1* | 4/2012 | Cohen | G06Q 10/02 235/382 |
| 2013/0214041 | A1* | 8/2013 | Wright | G07B 15/02 235/378 |
| 2015/0073883 | A1* | 3/2015 | Chan | G06Q 20/3278 705/13 |
| 2017/0046681 | A1* | 2/2017 | Dixon | G06Q 20/3278 |

FOREIGN PATENT DOCUMENTS

| | | | |
|---|---|---|---|
| CN | 103415858 A | 11/2013 | |
| CN | 104751334 A | 7/2015 | |
| CN | 106022819 A | 10/2016 | |
| CN | 106296293 A | 1/2017 | |
| CN | 106846506 A | 6/2017 | |
| EP | 1 517 272 A1 | 3/2005 | |
| EP | 1517272 A1 * | 3/2005 | ............... G07C 9/00 |
| GB | 2 423 853 A | 9/2006 | |
| WO | WO-2017029596 A1 * | 2/2017 | ......... G06Q 20/3827 |

OTHER PUBLICATIONS

Written Opinion dated Apr. 18, 2018 from the International Bureau in International Application No. PCT/CN2018/073867.

* cited by examiner

INFORMATION IDENTIFICATION CODE-BASED INFORMATION AUTHENTICATION METHOD AND TERMINAL

RELATED APPLICATION

This application is a continuation application based on a PCT Patent Application No. PCT/CN2018/073867, filed Jan. 23, 2018, whose priority is claimed on Chinese Patent Application No. 201710061391.1, filed on Jan. 25, 2017 the entire content of which are hereby incorporated by reference

FIELD OF THE TECHNOLOGY

The present disclosure relates to information authentication technologies, and in particular, to an information identification code-based information authentication method, a terminal, and a computer storage medium.

BACKGROUND OF THE DISCLOSURE

Subway travel and bus travel are indispensable parts in users' life. Currently, a physical one-way ticket or a physical One-Card is generally used as a ticket for ride. With intellectualization of a terminal and convenience of networking, ticket virtualization becomes a new trend. After a ticket is virtualized, a user only needs to take out a mobile phone terminal and swipe the mobile phone terminal on a corresponding identifier, to pay for ride. A technical solution of ticket virtualization in the existing technology is: A quick response code is presented and payment is performed through online authentication to ensure that users pay for ride by themselves; which is only specific to particular users whose specified payment channels have been provisioned.

Problems in the existing technology are: (1) Only being specific to particular users causes a user range to be restricted, a technical implementation for virtualization cannot benefit most people, and an application range is small. In addition, an original intention of this design applicable to particular users excessively depends on a particular architecture, and post-extension and post-development cannot continue to be performed. Only an original intention of a commonality design applicable to most people can satisfy user requirements and facilitate post-extension and post-development. (2) Although networking is convenient, various cases, for example, a case without network or with a poor network condition, need to be comprehensively considered during design. However, the online authentication solution in the existing technology cannot satisfy an authentication requirement when there is no network or a network condition is poor. That is, actually, authentication cannot be without network. Even though online authentication can be implemented when the network condition is poor, an online delay is brought due to fluctuation of the network condition, causing massive users to get stuck and line up, and fast authentication cannot be quickly implemented.

In the related technology, there is no effective solution for the foregoing problems.

SUMMARY

In view of this, embodiments of the present invention provide an information identification code-based information authentication method, a terminal, and a computer storage medium, to at least resolve problems in the existing technology.

Technical solutions of the embodiments of the present invention are implemented in this way:

An embodiment of the present invention provides an information identification code-based information authentication method, applied to a first terminal, the first terminal including one or more processors, a memory, and one or more programs, the one or more programs being stored in the memory, the program including one or more modules each corresponding to a set of instructions, the one or more processors being configured to execute the instructions, and the method including: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; and initiating, by the first terminal, a first request according to the information identification code, to request a second terminal to perform identity authentication on the first terminal to satisfy a target requirement.

An embodiment of the present invention provides an information identification code-based information authentication method, applied to a second terminal, the second terminal including one or more processors, a memory, and one or more programs, the one or more programs being stored in the memory, the program including one or more modules each corresponding to a set of instructions, the one or more processors being configured to execute the instructions, and the method including: parsing, by the second terminal, an information identification code in response to a first request to obtain a first identifier and a second identifier; performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the first request initiated by or received from a first terminal; and encapsulating, by the second terminal, a third identifier used for representing an identity of the second terminal and the information identification code including the first identifier and the second identifier into a second request, and sending the second request to a server, so that the server performs validity authentication according to the received second request and then performs corresponding processing related to a target requirement.

An embodiment of the present invention provides a first terminal, including: a trigger unit, configured to receive a first operation, and trigger, according to the first operation, a request for presenting an information identification code; a response unit, configured to generate an information identification code according to a locally-stored preset policy in response to the first operation, the information identification code carrying a first identifier used for representing a user identity and a second identifier used for representing a generation time of the information identification code; and a request initiation unit, configured to initiate a first request according to the information identification code, to request a second terminal to perform identity authentication on the first terminal to satisfy a target requirement.

An embodiment of the present invention provides a second terminal, including: a request response unit, configured to parse an information identification code in response to a first request to obtain a first identifier and a second identifier; an authentication unit, configured to: perform comparison authentication on the first identifier by using a locally-stored preset information check library to determine a user identity; perform comparison authentication on the second identifier by using a current time of the second terminal; and if a time difference falls within a preset time range, determine that the comparison authentication succeeds and accept the first request initiated by a first terminal; and a request sending unit, configured to encapsulate a third identifier used for representing an identity of the second terminal and the information identification code including the first identifier and the second identifier into a second request, and send the second request to a server, so that the server performs validity authentication according to the received second request and then performs corresponding processing related to a target requirement.

An information identification code-based information authentication method in an embodiment of the present invention is applied to a first terminal, the first terminal includes one or more processors, a memory, and one or more programs, the one or more programs are stored in the memory, the program includes one or more modules each corresponding to a set of instructions, the one or more processors are configured to execute the instructions, and the method includes: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; and initiating, by the first terminal, a gate-entering request or a gate-exiting request according to the information identification code, to request a second terminal to perform identity authentication on the first terminal to satisfy a target requirement on subway travel.

An information identification code-based information authentication method in an embodiment of the present invention is applied to a second terminal, the second terminal includes one or more processors, a memory, and one or more programs, the one or more programs are stored in the memory, the program includes one or more modules each corresponding to a set of instructions, the one or more processors are configured to execute the instructions, and the method includes: parsing, by the second terminal, an information identification code in response to a gate-entering request or a gate-exiting request to obtain a first identifier and a second identifier; performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the gate-entering request or the gate-exiting request initiated by a first terminal; and encapsulating, by the second terminal, a third identifier used for representing an identity of the second terminal and the information identification code including the first identifier and the second identifier into a second request, and sending the second request to a server, so that the server performs validity authentication according to the received second request and then performs corresponding processing related to subway travel.

An embodiment of the present invention provides a first terminal, including: a trigger unit, configured to receive a first operation, and trigger, according to the first operation, a request for presenting an information identification code; a response unit, configured to generate an information identification code according to a locally-stored preset policy in response to the first operation, the information identification code carrying a first identifier used for representing a user identity and a second identifier used for representing a generation time of the information identification code; and a request initiation unit, configured to initiate a gate-entering request or a gate-exiting request according to the information identification code, to request a second terminal to perform identity authentication on the first terminal to satisfy a target requirement on subway travel.

An embodiment of the present invention provides a second terminal, including: a request response unit, configured to parse an information identification code in response to a gate-entering request or a gate-exiting request to obtain a first identifier and a second identifier; an authentication unit, configured to: perform comparison authentication on the first identifier by using a locally-stored preset information check library to determine a user identity; perform comparison authentication on the second identifier by using a current time of the second terminal; and if a time difference falls within a preset time range, determine that the comparison authentication succeeds and accept the gate-entering request or the gate-exiting request initiated by a first terminal; and a request sending unit, configured to encapsulate a third identifier used for representing an identity of the second terminal and the information identification code including the first identifier and the second identifier into a second request, and send the second request to a server, so that the server performs validity authentication according to the received second request and then performs corresponding processing related to subway travel.

An information identification code-based information authentication method in an embodiment of the present invention is applied to a first terminal, the first terminal includes one or more processors, a memory, and one or more programs, the one or more programs are stored in the memory, the program includes one or more modules each corresponding to a set of instructions, the one or more processors are configured to execute the instructions, and the method includes: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; and initiating, by the first terminal, a ride request according to the information identification code, to request a second terminal to perform identity authentication on the first terminal to satisfy a target requirement on bus travel.

An information identification code-based information authentication method in an embodiment of the present invention is applied to a second terminal, the second terminal includes one or more processors, a memory, and one or more programs, the one or more programs are stored in the memory, the program includes one or more modules each corresponding to a set of instructions, the one or more processors are configured to execute the instructions, and the method includes: parsing, by the second terminal, an information identification code in response to a ride request to obtain a first identifier and a second identifier; performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the ride request initiated by a first terminal; and encapsulating, by the second terminal, a third identifier used for representing an identity of the second terminal and the information identification code including the first identifier and the second identifier into a second request, and sending the second request to a server, so that the server performs validity authentication according to the received second request and then performs corresponding processing related to bus travel.

An embodiment of the present invention provides a first terminal, including: a trigger unit, configured to receive a first operation, and trigger, according to the first operation, a request for presenting an information identification code; a response unit, configured to generate an information identification code according to a locally-stored preset policy in response to the first operation, the information identification code carrying a first identifier used for representing a user identity and a second identifier used for representing a generation time of the information identification code; and a request initiation unit, configured to initiate a ride request according to the information identification code, to request a second terminal to perform identity authentication on the first terminal to satisfy a target requirement on bus travel.

An embodiment of the present invention provides a second terminal, including: a request response unit, configured to parse an information identification code in response to a ride request to obtain a first identifier and a second identifier; an authentication unit, configured to: perform comparison authentication on the first identifier by using a locally-stored preset information check library to determine a user identity; perform comparison authentication on the second identifier by using a current time of the second terminal; and if a time difference falls within a preset time range, determine that the comparison authentication succeeds and accept the ride request initiated by a first terminal; and a request sending unit, configured to encapsulate a third identifier used for representing an identity of the second terminal and the information identification code including the first identifier and the second identifier into a second request, and send the second request to a server, so that the server performs validity authentication according to the received second request and then performs corresponding processing related to bus travel.

An embodiment of the present invention provides an information identification code-based information authentication method, applied to an information identification code-based information authentication system; a first terminal, a second terminal, and a server in the system each including one or more processors, a memory, and one or more programs, the one or more programs being stored in the memory, the program including one or more modules each corresponding to a set of instructions, and the one or more processors being configured to execute the instructions; and the method including: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; initiating, by the first terminal, a first request according to the information identification code, to request the second terminal to perform identity authentication on the first terminal to satisfy a target requirement; parsing, by the second terminal, the information identification code in response to the first request to obtain the first identifier and the second identifier; performing, by the second terminal, comparison authentication on the first identifier by using a locally-stored preset information check library to determine the user identity; performing, by the second terminal, comparison authentication on the second identifier by using a current time of the second terminal, and if a time difference falls within a preset time range, determining that the comparison authentication succeeds and accepting the first request initiated by the first terminal; encapsulating, by the second terminal, a third identifier used for representing an identity of the second terminal and the information identification code including the first identifier and the second identifier into a second request, and sending the second request to the server; and performing, by the server, validity authentication according to the received second request, and then performing corresponding processing related to the target requirement.

An embodiment of the present invention provides an information identification code-based information authentication system, including: a first terminal, a second terminal, and a server, where the first terminal is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a first request according to the information identification code, to request the second terminal to perform identity authentication on the first terminal to satisfy a target requirement; the second terminal is configured to: parse the information identification code in response to the first request to obtain the first identifier and the second identifier; perform comparison authentication on the first identifier by using a locally-stored preset information check library to determine the user identity; perform comparison authentication on the second identifier by using a current time of the second terminal, and if a time difference falls within a preset time range, determine that the comparison authentication succeeds and accept the first request initiated by the first terminal; and encapsulate a third identifier used for representing an identity of the second terminal and the information identification code including the first identifier and the second identifier into a second request, and send the second request to the server; and the server is configured to: perform validity authentication according to the received second request, and then perform corresponding processing related to the target requirement.

An embodiment of the present invention provides an information identification code-based information authentication method, applied to an information identification code-based information authentication system; a first terminal, a second terminal, and a server in the system each including one or more processors, a memory, and one or more programs, the one or more programs being stored in the memory, the program including one or more modules each corresponding to a set of instructions, and the one or more processors being configured to execute the instructions; and the method including: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; initiating, by the first terminal, a gate-entering request or a gate-exiting request according to the information identification code, to request a second terminal to perform identity authentication on the first terminal to satisfy a target requirement on subway travel; parsing, by the second terminal, the information identification code in response to the gate-entering request or the gate-exiting request to obtain the first identifier and the second identifier, performing, by the second terminal, comparison authentication on the first identifier by using a locally-stored preset information check library to determine the user identity; performing, by the second terminal, comparison authentication on the second identifier by using a current time of the second terminal, and if a time difference falls within a preset time range, determining that the comparison authentication succeeds and accepting the gate-entering request or the gate-exiting request initiated by the first terminal; encapsulating, by the second terminal, a third identifier used for representing an identity of the second terminal and the information identification code including the first identifier and the second identifier into a second request, and sending the second request to the server, and performing, by the server, validity authentication according to the received second request, and then performing corresponding processing related to the subway travel.

An embodiment of the present invention provides an information identification code-based information authentication system, including: a first terminal, a second terminal, and a server, where the first terminal is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a gate-entering request or a gate-exiting request according to the information identification code, to request the second terminal to perform identity authentication on the first terminal to satisfy a target requirement on subway travel; the second terminal is configured to: parse the information identification code in response to the gate-entering request or the gate-exiting request to obtain the first identifier and the second identifier, perform comparison authentication on the first identifier by using a locally-stored preset information check library to determine the user identity; perform comparison authentication on the second identifier by using a current time of the second terminal, and if a time difference falls within a preset time range determine that the comparison authentication succeeds and accept, by the second terminal, the gate-entering request or the gate-exiting request initiated by the first terminal; and encapsulate a third identifier used for representing an identity of the second terminal and the information identification code including the first identifier and the second identifier into a second request, and send the second request to the server, and the server is configured to: perform validity authentication according to the received second request, and then perform corresponding processing related to the subway travel.

An embodiment of the present invention provides an information identification code-based information authentication method, applied to an information identification code-based information authentication system; a first terminal, a second terminal, and a server in the system each including one or more processors, a memory, and one or more programs, the one or more programs being stored in the memory, the program including one or more modules each corresponding to a set of instructions, and the one or more processors being configured to execute the instructions; and the method including: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; initiating, by the first terminal, a ride request according to the information identification code, to request the second terminal to perform identity authentication on the first terminal to satisfy a target requirement on bus travel; parsing, by the second terminal, the information identification code in response to the ride request to obtain the first identifier and the second identifier; performing, by the second terminal, comparison authentication on the first identifier by using a locally-stored preset information check library to determine the user identity; performing, by the second terminal, comparison authentication on the second identifier by using a current time of the second terminal, and if a time difference falls within a preset time range, determining that the comparison authentication succeeds and accepting the ride request initiated by the first terminal; encapsulating, by the second terminal, a third identifier used for representing an identity of the second terminal and the information identification code including the first identifier and the second identifier into a second request, and sending the second request to the server, and performing, by the server, validity authentication according to the received second request, and then performing corresponding processing related to the bus travel.

An embodiment of the present invention provides an information identification code-based information authentication system, including: a first terminal, a second terminal, and a server, where the first terminal is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a ride request according to the information identification code, to request the second terminal to perform identity authentication on the first terminal to satisfy a target requirement on bus travel; the second terminal is configured to: parse the information identification code in response to the ride request to obtain the first identifier and the second identifier; perform comparison authentication on the first identifier by using a locally-stored preset information check library to determine the user identity; perform comparison authentication on the second identifier by using a current time of the second terminal, and if a time difference falls within a preset time range, determine that the comparison authentication succeeds and accept the ride request initiated by the first terminal; and encapsulate a third identifier used for representing an identity of the second terminal and the information identification code including the first identifier and the second identifier into a second request, and send the second request to the server; and the server is configured to: perform validity authentication according to the received second request, and then perform corresponding processing related to the bus travel.

An embodiment of the present invention provides a first terminal, including: a trigger unit, configured to receive, by the first terminal side, a first operation, and trigger, according to the first operation, a request for presenting an information identification code; a response unit, configured to generate, by the first terminal side, an information identification code according to a locally-stored preset policy in response to the first operation, the information identification code carrying a first identifier used for representing a user identity and a second identifier used for representing a generation time of the information identification code; a request initiation unit, configured to initiate a first request according to the information identification code, to request a second terminal to perform identity authentication on the first terminal to satisfy a target requirement; and a feedback receiving unit, configured to receive a feedback from a server, the feedback indicating that the server performs validity authentication according to a received second request and then performs corresponding processing related to the target requirement.

An embodiment of the present invention provides a server, including: a request receiving unit, configured to receive a second request initiated by a second terminal after the second terminal makes a response to a first request, the first request including an information identification code including a first identifier used for representing a user identity and a second identifier used for representing a generation time of the information identification code, the information identification code being generated according to a locally-stored preset policy when a response is made to a first operation, and the second request including a third identifier used for representing an identity of the second terminal and the information identification code including the first identifier and the second identifier; and an authentication processing unit, configured to perform validity authentication according to the received second request, and then perform corresponding processing related to a target requirement.

An embodiment of the present invention provides a computer storage medium, storing a computer executable instruction, and the computer executable instruction being used for performing the information identification code-based information authentication method according to any one of the embodiments of the present invention.

The information identification code-based information authentication method in the embodiments of the present invention includes: receiving, by a first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; and initiating, by the first terminal, a first request according to the information identification code, to request a second terminal to perform identity authentication on the first terminal to satisfy a target requirement. The first terminal generates and sends the information identification code, so that the second terminal parses the information identification code in response to the first request to obtain the first identifier and the second identifier, and then performs comparison authentication on the first identifier by using the locally-stored preset information check library to determine the user identity. The second terminal performs comparison authentication on the second identifier by using the current time of the second terminal, and if the time difference falls within the preset time range, determines that the comparison authentication succeeds and accepts the first request initiated by the first terminal. The second terminal encapsulates the third identifier used for representing the identity of the second terminal and the information identification code including the first identifier and the second identifier into the second request and sends the second request to the server, so that the server performs validity authentication according to the received second request and performs corresponding processing related to the target requirement.

Additionally, the devices described herein may respectively comprise at least one memory configured to store computer program code, and at least one processor, such as a hardware processor, configured to access the at least one memory and operate according to the computer program code, where the computer program code comprises various codes, described as units throughout according to embodiments, configured to cause the at least one processor to implement various features. According to the embodiments of the present invention, a ticket virtualization technology benefits all people, an application range is wide, an original intention of a commonality design satisfies user requirements, and post-extension and post-development are facilitated. Even though networking is poor, for example, there is no network or a network condition is poor, authentication can also be implemented. According to offline authentication in the embodiments of the present invention, users do not need to get stuck and line up massively during fluctuation of the network condition even if the network condition is poor. This is a mechanism for quickly implementing authentication.

DESCRIPTION OF EMBODIMENTS

Figure 1:
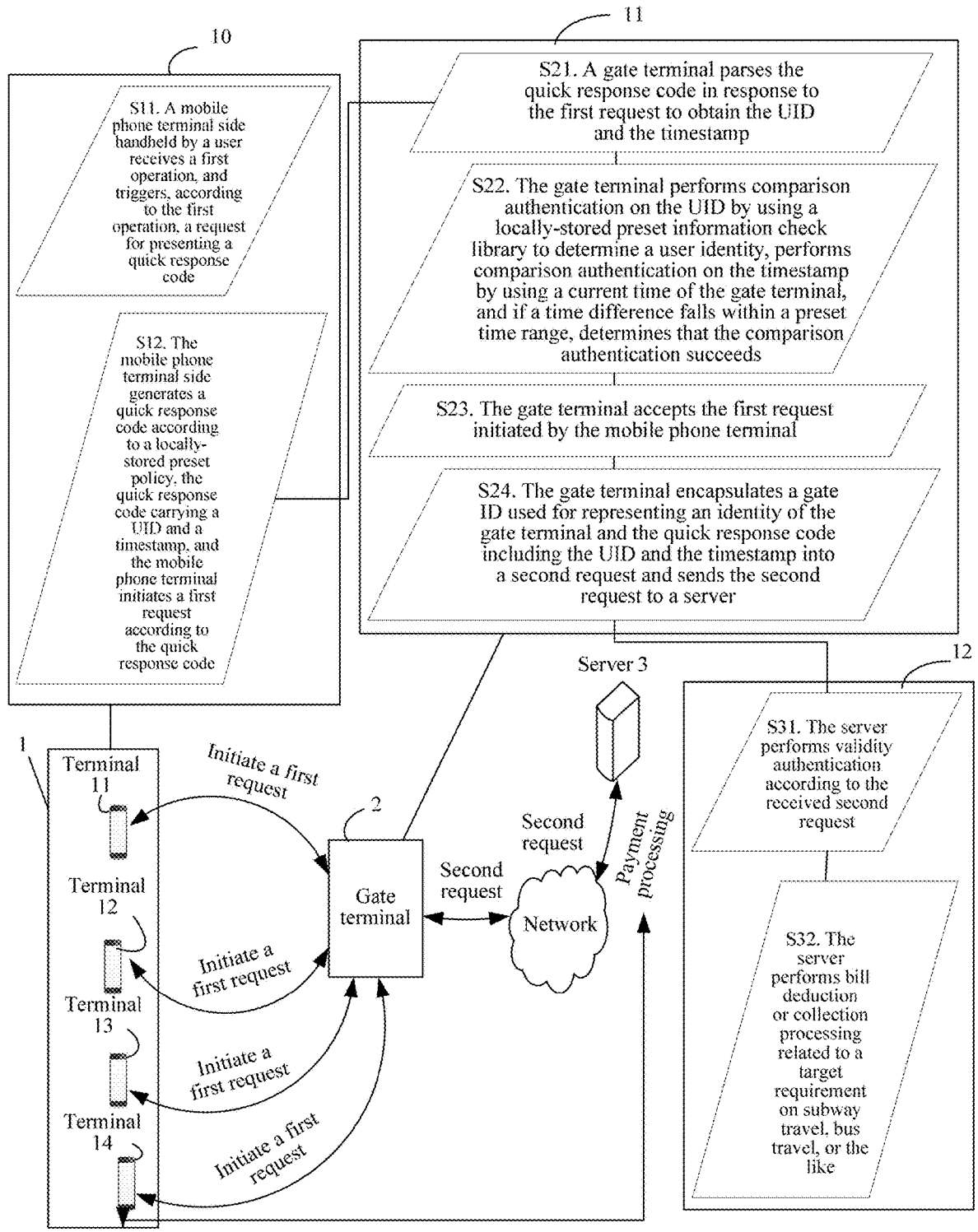
FIG. 1 is a schematic diagram of hardware entities performing information exchange according to an embodiment of the present invention.

Implementation of technical solutions is further described in detail below with reference to the accompanying drawings.

A mobile terminal for implementing each embodiment of the present invention is described below with reference to the accompanying drawings. In subsequent descriptions, postfixes such as "module". "component" or "unit" that are used for representing elements are used merely for convenience of descriptions of the embodiments of the present invention, and have no particular meaning. Therefore, "module" and "component" may be mixed to use.

In the following detailed descriptions, many specific details are stated to thoroughly understand the present disclosure. However, for a person of ordinary skill in the art, apparently, the present disclosure may be implemented without these specific details. In other cases, disclosed well-known methods, processes, assemblies, circuits, and networks are not described in detail, to avoid unnecessary ambiguousness in each aspect of the embodiments.

In addition, although terms such as "first" and "second" are used for a plurality of times in this specification to describe various elements (or various thresholds, various applications, various instructions, or various operations) and the like, these elements (or thresholds, applications, instructions, or operations) should not be limited to these terms. These terms are merely used for distinguishing one element (or threshold, application, instruction, or operation) from another element (or threshold, application, instruction, or operation). For example, a first operation may be referred to as a second operation and a second operation may also be referred to as a first operation without departing from the scope of the present disclosure. The first operation and the second operation are both operations, but the two operations are not the same.

Steps in the embodiments of the present invention may not be performed in a described step order. The steps may be selectively disordered and rearranged according to a requirement, a step in an embodiment may be deleted, or a step may be added to an embodiment. The step descriptions in the embodiments of the present invention are merely an optional order combination and do not represent all step order combinations in the embodiments of the present invention. A step order in the embodiments should not be considered as a limitation on the present disclosure.

The term "and/or" in the embodiments of the present invention refers to any and all possible combinations including one or more of related listed items. It should be further noted that, in this specification, "include/comprise" specifies existence of stated features, integers, steps, operations, elements, and/or components, buts does not exclude existence or addition of one or more other features, integers, steps, operations, elements, and/or components and/or a group thereof.

An intelligent terminal (for example, a mobile terminal) in the embodiments of the present invention may be implemented in various forms. For example, the mobile terminal described in the embodiments of the present invention may include mobile terminals such as a mobile phone, a smartphone, a notebook computer, a digital broadcast receiver, a personal digital assistance (PDA), a tablet computer (PAD), a portable media player (PMP), and a navigation apparatus and fixed terminals such as a digital TV and a desktop computer. It is assumed that a terminal is a mobile terminal below. However, a person skilled in the art should understand that, unless an element particularly used for a mobile purpose, a construction according to an implementation of the present disclosure can also be applied to a terminal of a fixed type.

FIG. 1 is a schematic diagram 100 of hardware entities performing information exchange according to an embodiment of the present invention. FIG. 1 includes one or more terminal device group 1, a terminal device 2, and a server 3. In FIG. 1, the terminal device group 1 includes terminal devices 11-14 which may be mainly mobile phone terminals handheld by one or more users. The terminal device 2 is a gate terminal. The terminal device exchanges information with the server through a wired network or a wireless network. The terminal device includes types such as a mobile phone, a desktop computer, a PC computer, and an all-in-one computer. In the existing technology, only being specific to particular users causes a user range to be restricted, and an application range is small. In addition, an original intention of this design applicable to particular users excessively depends on a particular architecture, and post-extension and post-development cannot continue to be performed. Various cases, for example, a case without network or with a poor network condition, need to be comprehensively considered during design. However, the online authentication solution in the existing technology cannot satisfy an authentication requirement when there is no network or a network condition is poor. That is, actually, authentication cannot be without network. Even though online authentication can be implemented when the network condition is poor, an online delay is brought due to fluctuation of the network condition, causing massive users to get stuck and line up, and fast authentication cannot be quickly implemented. A security mechanism implemented depending on a quick response code is easy to be cracked, and user information security cannot be ensured.

In this specification, a first terminal is used for representing the terminal deice group 1 (for example, a mobile phone terminal), a second terminal is used for representing the terminal device 2 (for example, a gate terminal), and the server 3 may be a background server.

For these problems, this embodiment of the present invention is used. As shown in FIG. 1, processing logic 10 of the first terminal side includes: S11. The first terminal (for example, a mobile phone terminal handheld by a user) side receives a first operation, and triggers, according to the first operation, a request for presenting an information identification code (for example, a quick response code); S12. The first terminal side generates an information identification code according to a locally-stored preset policy (for example, a quick response code off-line generation policy) in response to the first operation, the information identification code carrying a first identifier (for example, a UID) used for representing a user identity and a second identifier (for example, a timestamp) used for representing a generation time of the information identification code, and the first terminal (for example, the mobile phone terminal) initiates a first request according to the information identification code (for example, the quick response code), to request the second terminal (for example, the gate terminal) to perform identity authentication on the first terminal to satisfy a target requirement (where for example, in a subway scenario, the mobile phone terminal aligns the quick response code with an identification area on the gate terminal for code scanning, to request the second terminal to allow the first terminal to enter the station through code scanning and exit from the station through code scanning, to satisfy a requirement on subway travel; for another example, in a bus scenario, the mobile phone terminal aligns the quick response code with an identification area on the gate terminal for code scanning, to request the second terminal to allow the first terminal to pass through code scanning, to satisfy a requirement on bus travel. Processing logic 11 of the second terminal side includes: S21. The second terminal parses the information identification code in response to the first request to obtain the first identifier and the second identifier; S22. The second terminal performs comparison authentication on the first identifier by using a locally-stored preset information check library to determine the user identity, performs comparison authentication on the second identifier by using a current time of the second terminal, and if a time difference falls within a preset time range (for example, one minute), determines that the comparison authentication succeeds; S23. The second terminal accepts the first request initiated by the first terminal (the mobile phone terminal); S24. The second terminal encapsulates a third identifier (for example, a gate ID) used for representing an identity of the second terminal and the information identification code including the first identifier (for example, the UID) and the second identifier (for example, the timestamp) into a second request and sends the second request to the server. Processing logic 12 of the server side includes: S31. The server performs validity authentication according to the received second request; S32. The server performs payment processing (for example, bill deduction or collection processing) related to the target requirement.

In this embodiment of the present invention, a ticket virtualization technology benefits all people, an application range is wide, an original intention of a commonality design satisfies user requirements, and post-extension and post-development are facilitated. Even though networking is poor, for example, there is no network or a network condition is poor, authentication can also be implemented. According to offline authentication in the embodiments of the present invention, users do not need to get stuck and line up massively during fluctuation of the network condition even if the network condition is poor. This is a mechanism for quickly implementing authentication. In this embodiment of the present invention, a security mechanism is not implemented depending on the quick response code, an asymmetric encryption system is used, and a plurality of encryption methods may be furthered used for assistance, so that the mechanism is very difficult to be cracked, and user information security can be more effectively ensured.

The example in FIG. 1 is merely an example of a system architecture for implementing the embodiments of the present invention, and the embodiments of the present invention are not limited to the system architecture shown in FIG. 1. Each embodiment of the present invention is provided based on the system architecture shown in FIG. 1.

Figure 2:
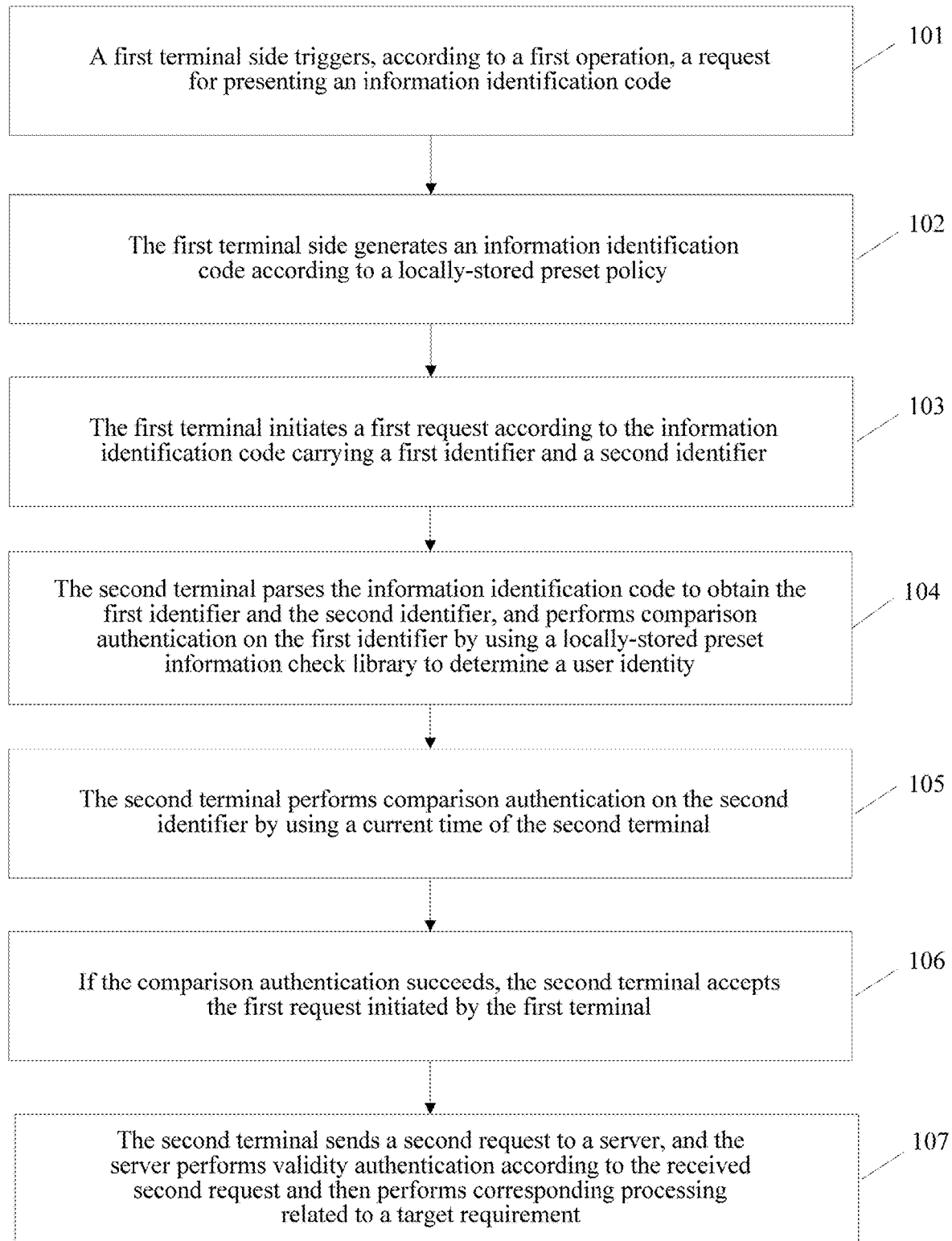
FIG. 2 is a schematic flowchart of implementation of a method according to an embodiment of the present invention.

An embodiment of the present invention provides an information identification code-based information authentication method 200, as shown in FIG. 2, including the following steps: A first terminal side receives a first operation, and triggers, according to the first operation, a request for presenting an information identification code (101). Currently, as electronic services such as electronic payment become popular, a physical code is gradually replaced with an information identification code. A graphic code is used as a type of the information identification code. Specifically, the graphic code may include a quick response code, a barcode, a magnetic barcode, and the like. The quick response code is more convenient and more widely applicable to use scenarios. Therefore, in this embodiment of the present invention, the quick response code is used as an example. For the quick response code, particular black-and-white geometric figures that are arranged in a plane (in a two-dimensional direction) according to a rule are used for recording data symbol information. A concept of "0" and "1" bitstreams forming the basis of computer internal logic is skillfully used based on code compiling, a plurality of geometric figures corresponding to a binary system is used for indicating text and value information, and automatic identification and reading are performed by using an image input device or an optoelectronic scanning device to implement automatic information processing. The barcode is mostly used for identifying commodity packaging in a supermarket, to determine a commodity type, a commodity name, and the like. The magnetic barcode is mostly used for card issuing of a bank. The quick response code may also be understood as a special barcode, and has some generalities of the barcode. For example, each code style has a particular character set; each character occupies a width; and the quick response code has a check function. In addition, the quick response code further has functions of automatically identifying information not in the same row and processing a rotation change point of a figure. After a physical ticket is virtualized into a quick response code, a user only needs to take out a mobile phone terminal to swipe the quick response code on a corresponding identifier, to pay for ride. The first terminal side generates an information identification code according to a locally-stored preset policy in response to the first operation (102). It should be noted that a manner of generating the information identification code is an offline manner, the terminal side does not need to interact with a background server, and no network is required. The preset policy is the same as a policy used by the background server for generating the information identification code. Using a quick response code as an example of the information identification code, the preset policy includes content required for conversion into the quick response code. For example, in an application downloading scenario, the quick response code may be a download website of the application. In a subway/bus scenario of this embodiment of the present invention, the content, included in the preset policy, required for conversion into the quick response code is: a first identifier (for example, a UID) used for representing a user identity and current time information collected in real time during station entering, that is, a second identifier (for example, a timestamp). In the preset policy, after the content required for conversion into the quick response code is determined, a plurality of geometric figures corresponding to the binary system is further required to indicate the content. The content is converted into geometric figures in the concept of "0" and "1", so that black-and-white geometric figures that are arranged in a plane (in a two-dimensional direction) according to a rule are used for recording data symbol information. A final result generated according to the preset policy is a quick response code that can be automatically identified by using the image input device or the optoelectronic scanning device. A quick response code generator may alternatively be installed in the terminal, and the quick response code or the like is automatically generated by using the quick response code generator. The information identification code carries the first identifier (for example, the UID) used for representing the user identity and the second identifier (for example, the timestamp) used for representing a generation time of the information identification code. The first terminal initiates a first request according to the information identification code carrying the first identifier (for example, the UID) and the second identifier (for example, the timestamp) (103), to request, by using the first request, a second terminal to perform identity authentication on the first terminal to satisfy a target requirement. For example, in a subway scenario, the first terminal aligns the quick response code with an identification area on the second terminal for code scanning, to request the second terminal to allow the first terminal to enter a station through code scanning and subsequently exit from the station. A gate-entering blacklist and a gate-exiting whitelist are matched to use, so that identity authentication can be performed on the same user during station entering and exiting. After the authentication succeeds, a requirement of the user on subway travel is satisfied. For another example, in a bus scenario, the first terminal aligns the quick response code with an identification area on the second terminal for code scanning, to request the second terminal to scan the code of the first terminal. A malicious list is matched to use, and after identity authentication succeeds, a requirement of the user on bus travel is satisfied. Both in the subway scenario and the bus scenario, a gate performs comparison authentication by using a local information check library when being offline. In the bus scenario, the authentication is performed once, and in the subway scenario, the authentication is performed twice for station entering and station existing. As the manner for the information identification code is also an offline manner. In this embodiment of the present invention, a double-offline mechanism is used. A network condition does not need to be considered, no networking is required, and during subsequent payment, the payment is confirmed online after a delay. The second terminal parses the information identification code in response to the first request to obtain the first identifier (for example, the UID) and the second identifier (for example, the timestamp), and performs comparison authentication on the first identifier (for example, the UID) by using a locally-stored preset information check library to determine a user identity (104). The second terminal performs comparison authentication on the second identifier (for example, the timestamp) by using a current time of the second terminal (105). If a time difference falls within a preset time range (for example, one minute), the second terminal determines that the comparison authentication succeeds, and accepts the first request initiated by the first terminal (the mobile phone terminal) (106). The second terminal encapsulates a third identifier (for example, a gate ID) used for representing an identity of the second terminal and the information identification code (for example, the quick response code) including the first identifier (the UID) and the second identifier (the timestamp) into a second request, and sends the second request to a server. The server (for example, a background server of Tenpay, used for payment authentication) performs validity authentication according to the received second request, and then performs payment processing related to the target requirement (107). The payment processing includes processing of direct bill deduction or collection initiation. If there is a balance in a user account, direct bill deduction is performed. If there is no balance in a user account, collection is initiated. If not performing payment, the user cannot use the application to generate a quick response code, that is, cannot implement ride travel (subway travel or bus travel).

In an actual application, the mobile phone terminal side receives a first operation, and triggers, according to the first operation, a request for presenting a quick response code. The mobile phone terminal side generates a quick response code according to a local quick response code off-line generation policy or a quick response code offline generation policy in response to the first operation, and the quick response code carries a UID used for representing a user identity and a timestamp used for representing a generation time of the information identification code. The mobile phone terminal initiates a first request according to the quick response code, to request a second terminal to perform identity authentication on the mobile phone terminal to satisfy a target requirement. In a subway scenario, the mobile phone terminal aligns the quick response code with an identification area on a gate terminal for code scanning, to request the second terminal to allow the first terminal to enter a station through code scanning and subsequently exit from the station. A gate-entering blacklist and a gate-exiting whitelist are matched to use, so that identity authentication can be performed on the same user during station entering and exiting. After the authentication succeeds, a ride requirement of the user is satisfied. In a bus scenario, the mobile phone terminal aligns the quick response code with an identification area on a gate terminal for code scanning, to request the second terminal to scan the code of the second terminal. A malicious list is matched to use, and after identity authentication succeeds, a ride requirement of the user is satisfied. The gate terminal parses the quick response code in response to the first request to obtain the UID and the timestamp. The gate terminal performs comparison authentication on the UID by using a locally-stored preset information check library to determine the user identity. Subsequently, the gate terminal performs comparison authentication on the timestamp by using a current time of the gate terminal, and if a time difference falls within a preset time range, for example, within one minute, determines that the comparison authentication succeeds and accepts the first request initiated by the mobile phone terminal.

In an actual application, the gate terminal encapsulates a gate ID used for representing an identity of the gate terminal and the quick response code including the UID and the timestamp into a second request, and sends the second request to a server.

In an actual application, in the foregoing authentication, not only the comparison authentication of the UID and the timestamp is included, but also validity authentication and other security authentication are further included. In the subway scenario, in the authentication of the UID and the timestamp, comparison authentication is performed on the UID by using the gate-entering blacklist. During the comparison authentication of the timestamp, the timestamp is compared with the current time of the gate to determine whether the time difference falls within one minute. In the bus scenario, in the authentication of the UID and the timestamp, comparison authentication is performed on the UID by using the malicious list. During the comparison authentication of the timestamp, the timestamp is compared with the current time of the gate to determine whether the time difference falls within one minute. If the comparison authentication succeeds, the gate terminal accepts the first request initiated by the mobile phone terminal. For example, in the subway scenario, station entering and station exiting are allowed for ride. In the bus scenario, ride is directly implemented. The gate terminal encapsulates the gate ID used for representing the identity of the gate terminal and the quick response code including the UID and the timestamp into the second request, and sends the second request to the server. The server performs validity authentication according to the received second request and then performs payment processing (bill deduction or collection processing) related to the target requirement (for example, subway travel or bus travel).

According to this embodiment of the present invention, the double-offline mechanism is used, that is, (1) the quick response code is generated offline without online interaction with the background server; (2) the gate terminal performs local comparison authentication without online interaction with the background server. Asymmetric encryption is used, which differs from the related technology (where currently, an online solution through interaction with background is used). In a system, the mobile phone terminal, the gate terminal, and the background server are involved. In an actual application, the system is not limited to these execution entities interacted with each other.

An embodiment of the present invention provides an information identification code-based information authentication method, including: receiving, by a first terminal (for example, a mobile phone terminal) side, a first operation, and triggering, according to the first operation, a request for presenting an information identification code (for example, a quick response code); generating, by the first terminal (for example, the mobile phone terminal) side, an encrypted information identification code (for example, a quick response code) according to a locally-stored preset policy (for example, a quick response code off-line generation policy, or referred to as a quick response code offline generation policy, in response to the first operation, the encrypted information identification code (for example, the quick response code) carrying a first identifier (for example, a UID) used for representing a user identity and a second identifier (a timestamp) used for representing a generation time of the information identification code; and initiating, by the first terminal (for example, the mobile phone terminal), a first request according to the encrypted information identification code (for example, the quick response code), to request a second terminal to perform identity authentication on the first terminal to satisfy a target requirement. In a subway scenario, the mobile phone terminal aligns the quick response code with an identification area on a gate terminal for code scanning, to request the second terminal to allow the first terminal to enter a station through code scanning and subsequently exit from the station. A gate-entering blacklist and a gate-exiting whitelist are matched to use, so that identity authentication can be performed on the same user during station entering and exiting. After the authentication succeeds, a ride requirement of the user is satisfied. In a bus scenario, the mobile phone terminal aligns the quick response code with an identification area on a gate terminal for code scanning, to request the second terminal to scan the code of the second terminal. A malicious list is matched to use, and after identity authentication succeeds, a ride requirement of the user is satisfied. In the bus scenario, authentication is performed once, which differs from authentication performed twice for station entering and station exiting in the subway scenario.

In this embodiment of the present invention, the second terminal (for example, a gate terminal) decrypts the encrypted information identification code according to an asymmetric encryption policy (where the quick response code is encrypted by using a private key, the private key may be stored in a background server, and the gate performs decryption by using a public key) in response to the first request and parses the information identification code to obtain the first identifier (the UID) and the second identifier (the timestamp). The second terminal (for example, the gate terminal) performs comparison authentication on the first identifier (the UID) and the second identifier (the timestamp) by using a locally-stored preset information check library. The authentication herein includes validity authentication, authentication of the UID and the timestamp, and other security authentication. In the subway scenario, in the authentication of the UID and the timestamp, comparison authentication is performed on the UID by using a gate-entering blacklist. During the comparison authentication of the timestamp, the timestamp is compared with a current time of the gate to determine whether a time difference falls within one minute. In the bus scenario, in the authentication of the UID and the timestamp, comparison authentication is performed on the UID by using a malicious list. During the comparison authentication of the timestamp, the timestamp is compared with a current time of the gate to determine whether a time difference falls within one minute. If the comparison authentication succeeds, the second terminal (for example, the gate terminal) accepts the first request initiated by the first terminal (the mobile phone terminal). In the subway scenario, station entering and station exiting are allowed for ride. In the bus scenario, ride is directly implemented.

In this embodiment of the present invention, the second terminal (for example, the gate terminal) encapsulates a third identifier (for example, a gate ID) used for representing an identity of the second terminal and the information identification code (for example, the quick response code) including the first identifier (the UID) and the second identifier (the timestamp) into a second request and sends the second request to a server. The server performs validity authentication according to the received second request and then performs payment processing (bill deduction or collection processing) related to the target requirement.

According to this embodiment of the present invention, a double-offline mechanism is used, that is, (1) the quick response code is generated offline without online interaction with a background server; (2) the gate terminal performs local comparison without online interaction with the background server. Asymmetric encryption is further used, to ensure user information security.

Based on the foregoing embodiment, the following descriptions are provided by using a subway travel scenario as an example:

In this embodiment of the present invention, when the target requirement is subway travel, the first request initiated by the mobile phone terminal according to the quick response code is a gate-entering request, to request the gate terminal to allow the mobile phone terminal to enter a station through code scanning. In a process in which the gate terminal (specifically, an entry gate) performs comparison authentication on the UID by using the locally-stored preset information check library to determine the user identity, if the UID is in a malicious number library, the gate terminal rejects the gate-entering request initiated by the mobile phone terminal, that is, rejects to open the gate to allow the user to pass through. If the UID is in a gate-entering blacklist, the gate terminal rejects the gate-entering request initiated by the mobile phone terminal, that is, rejects to open the gate to allow the user to pass through. If the UID is neither in the malicious number library nor in the gate-entering blacklist, the gate terminal accepts the gate-entering request initiated by the mobile phone terminal, that is, opens the gate to allow the user to pass through, and adds the UID to the gate-entering blacklist, so that after the gate terminal subsequently reports the gate ID of the gate terminal and the quick response code including the UID and the timestamp to the server, the server obtains the UID through parsing, synchronizes the UID to all entry gates and exit gates, and updates the gate-entering blacklist and a gate-exiting whitelist. Content in the gate-entering blacklist may be consistent with that in the gate-exiting whitelist. Detection in the gate terminal is offline. Therefore, the same UID in the gate-entering blacklist and a gate exiting whitelist is required to ensure that a user only entering a gate can exit from a gate.

In this embodiment of the present invention, the server parses the second request to obtain the gate ID and the quick response code including the UID and the timestamp, performs validity check on the quick response code to confirm authenticity of the quick response code, then parses the quick response code to obtain the UID, and updates the UID to the gate-entering blacklist and the gate-exiting whitelist of the gate terminal, that is, broadcasts the UID to gate-entering blacklists of all the entry gates and broadcasts the UID to gate-exiting whitelists of all the exit gates. Subsequently, the server pushes, to the mobile phone terminal, information indicating that the mobile phone terminal has entered a gate. In this case, check related to gate entering is completed.

In this embodiment of the present invention, after the server pushes, to the mobile phone terminal, the information indicating that the mobile phone terminal has entered a gate, the mobile phone terminal initiates a gate-exiting request according to the quick response code, to request the gate terminal to allow the mobile phone terminal to exit from the station through code scanning. The mobile phone terminal aligns the quick response code with an identification area on the gate terminal to scan the code, to request the gate terminal to allow the mobile phone terminal to exit from the station through code scanning. The gate terminal (specifically an exit gate) parses the gate-exiting request in response to the gate-exiting request to obtain the UID and the timestamp. When the gate terminal performs comparison authentication on the UID by using the locally-stored preset information check library to determine the user identity, if the UID is in the malicious number library, the gate terminal rejects the gate-exiting request initiated by the mobile phone terminal, that is, rejects to open the gate to allow the user to pass through. If the UID is not in the gate-exiting whitelist, the gate terminal rejects the gate-exiting request initiated by the mobile phone terminal, that is, rejects to open the gate to allow the user to pass through. If the UID is in the gate-exiting whitelist, the gate terminal performs comparison authentication on the timestamp by using a current time of the gate terminal, and if a time difference falls within a preset time range (for example, one minute), determines that the comparison authentication succeeds and accepts the gate-exiting request initiated by the mobile phone terminal, that is, opens the gate to allow the user to pass through. Subsequently, the UID is deleted from the gate-exiting whitelist.

In this embodiment of the present invention, the gate terminal encapsulates the gate ID used for representing an identity of the gate terminal, the quick response code including the UID and the timestamp, and bill information obtained according to the gate-entering request and the gate-exiting request into a third request, and sends the third request to the server. The server parses the third request to obtain, for example, the gate ID, the quick response code including the UID and the timestamp, and the bill information. After performing validity check on the quick response code to determine the authenticity of the quick response code, the server initiates a payment request (bill deduction or collection) according to the bill information to complete payment processing, parses the quick response code to obtain the UID, and deletes the UID from the gate-entering blacklist and the gate-exiting whitelist.

According to this embodiment of the present invention, the gate terminal reports the gate ID of the gate terminal, the quick response code including the UID and the timestamp, and the bill information to the server for validity authentication of the quick response code, payment processing of bill deduction or collection is performed. After the payment processing succeeds, the server parses the quick response code to obtain the UID, and deletes the UID from the gate-entering blacklist and the gate-exiting whitelist. In the foregoing operations, the same UID in the gate-entering blacklist and a gate exiting whitelist is required to ensure that only a user entering a gate can exit from a gate. After gate existing is completed, recoding of the UID needs to be cleared.

In an actual application, for a check mechanism of the gate, the gate is offline when determining whether a user passes through, but needs to perform delayed networking after allowing the user to pass through, to upload user data and the gate ID to subway/bus background and then to the background server for data check and parsing. The gate is required to be offline during determining. Therefore, a gate-entering blacklist mechanism and a gate-exiting whitelist mechanism are introduced. For the gate-entering blacklist, a blacklist is set during gate entering. After a user passes through the gate, a UID of the user is added to the blacklist, and the blacklist is delivered by using a local area network of a subway corporation or a background server, to synchronize the blacklist to all entry gates. When no instruction from the server end is received, the blacklist also needs to be regularly updated. Data existing over a time (for example, two hours) in the blacklist is all cleared. For the gate-exiting whitelist, in the subway scenario, after a user passes through an entry gate, and after the background server determines that the quick response code is available, a UID of the user is delivered to whitelists of all exit gates. Only a user in the whitelist can exit from a gate. After the user exits from the gate, and after bill deduction initiated by the background server succeeds, this transaction is completed. The background server sends an instruction, to delete the user from both the blacklist and the whitelist. The whitelist also needs to be regularly updated, specifically subject to the longest duration of stay that is allowed by the subway corporation. For the malicious list, when detecting that a user is a malicious user or may maliciously propagate a transportation code, the background server adds a UID of the user to the malicious list, delivers the malicious list to all gates, and no longer generates a transportation code for the user.

In an actual application, after the entry gate decrypts the quick response code by using the public key, required check includes: user identification information (the UID), used for determining the user identity and determining, through comparison, whether the user is in the blacklist or the malicious list, where if yes, the user is not allowed to pass through; QQ quick response code transportation payment check information, used for distinguishing from another product of the same type; user timestamp information, used for notifying the gate of the generation time of the quick response code, where only a quick response code generated within one minute is allowed to pass through; and security check information, including a complex algorithm, where the user is allowed to pass through only when initial security check succeeds.

In an actual application, after the entry gate decrypts the quick response code by using a public key, required check includes: user identification information (the UID), used for determining the user identity, where if not in the whitelist, the user is not allowed to pass through; QQ quick response code transportation payment check information, used for distinguishing from another product of the same type; user timestamp information, used for notifying the gate of a generation time of the quick response code, where only a quick response code within one minute is allowed to pass through; and security check information, including a complex algorithm, where a user is allowed to pass through only when initial security check succeeds.

In an actual application, check of the background server includes: After receiving user quick response code data and the gate ID that are sent from the subway/bus, the server determines validity of the payment request. Specifically, the determining includes: integrity determining of the payment request, to determine whether all necessary information is included, whether a merchant is authorized, whether merchant information and purchaser information are correct, whether an order status is closed or paid, whether the quick response code is a transportation code for subway/bus payment, whether the quick response code is overdue, and whether an account balance is sufficient; determining of gate ID information; and determining of risk management information, mainly including a quantity of times and a limit of one-day consumption, an anti-fraud policy, and whether password verification is required. The server maintains the blacklist mechanism and the whitelist mechanism of the gate, determines validity of the user quick response code data, initiates a bill deduction request, and pushes a related account message.

Based on the foregoing embodiment, the following descriptions are provided by using a bus travel scenario as an example:

In this embodiment of the present invention, when the target requirement is bus travel, the first request initiated by the mobile phone terminal according to the quick response code is a ride request, to request the gate terminal to allow the mobile phone terminal to pass through code scanning. In the bus scenario, the mobile phone terminal aligns the quick response code with an identification area on the gate terminal for code scanning, to request the second terminal to scan the code of the first terminal. The malicious list is matched to use, and after the identity authentication succeeds, the ride requirement of the user is satisfied. In the bus scenario, authentication of the gate is performed once, which differs from gate authentication is performed twice for station entering using the entry gate and station exiting using the exit gate in the subway scenario. In a process in which the gate terminal performs comparison authentication on the UID by using the locally-stored preset information check library to determine the user identity, if the UID is in a malicious number library, the gate terminal rejects the ride request initiated by the mobile phone terminal, that is, rejects to allow the user to pass through. If the UID is not in the malicious number library, the gate terminal accepts the ride request initiated by the mobile phone terminal, that is, allows the user to pass through, and adds the UID to a malicious number blacklist. A quick response code that has been used by a user needs to be added to the malicious number blacklist herein, to avoid repeated use and replication, and the malicious number blacklist is delivered and synchronized to all gates by using bus background or the background server. Detection of the gate terminal is offline. Therefore, the malicious number blacklist is required to ensure that a user having entered a gate for ride cannot enter a station or enter a gate again.

In this embodiment of the present invention, after bill information obtained according to the ride request is encapsulated into the second request and the second request is sent to the server, in a process in which the server performs validity authentication according to the received second request and then performs the payment processing related to the target requirement, the server parses the second request to obtain the gate ID, the quick response code including the UID and the timestamp, and the bill information. After performing validity check on the quick response code to determine authenticity of the quick response code, the server initiates a payment request (bill deduction or collection) according to the bill information to complete the payment processing. The server parses the quick response code to obtain the UID, updates the UID to the malicious number blacklist if the user identified by the UID is a malicious user, and delivers the malicious number blacklist to the gate terminal.

According to this embodiment of the present invention, a double-offline authentication mechanism is used. During pass-through from the gate, the mobile phone is offline, and the gate is also offline. During the pass-through from the gate, the offline manner is used, to maximally ensure quickness and stability of the user during the pass-through from the gate, and comply with 300 ms stipulated by the transportation department. Online authentication is used in the existing technology, and a time of 300 ms cannot be achieved. After the pass-through from the gate, the quick response code of the user is then sent to the server to authenticate validity of the quick response code, and the user is added to the malicious list if the user is an unauthorized user, to implement both security in quickness and security in cash.

An embodiment of the present invention provides a first terminal, including: a trigger unit, configured to receive, by the first terminal side, a first operation, and trigger, according to the first operation, a request for presenting an information identification code; a response unit, configured to generate, by the first terminal side, an information identification code according to a locally-stored preset policy in response to the first operation, the information identification code carrying a first identifier used for representing a user identity and a second identifier used for representing a generation time of the information identification code; a request initiation unit, configured to initiate a first request according to the information identification code, to request a second terminal to perform identity authentication on the first terminal to satisfy a target requirement; a request response unit, configured to parse, by the second terminal, the information identification code in response to the first request to obtain the first identifier and the second identifier for identity authentication, and apply to a server for validity authentication by using a second request after the identity authentication succeeds, the second request including a third identifier used for representing an identity of the second terminal and the information identification code including the first identifier and the second identifier; and a feedback receiving unit, configured to receive a feedback from the server, the feedback indicating that the server performs validity authentication according to the received second request and then performs corresponding processing related to the target requirement.

According to this embodiment of the present invention, after triggering the request for presenting the information identification code, the first terminal side generates the information identification code according to the locally-stored preset policy, the information identification code carrying the first identifier used for representing the user identity and the second identifier used for representing the generation time of the information identification code. After initiating the first request according to the information identification code, the first terminal sends the first request to the second terminal to request a second terminal to perform identity authentication on the first terminal to satisfy the target requirement. After parsing the first request to obtain the first identifier and the second identifier, the second terminal performs comparison authentication on the first identifier by using a locally-stored preset information check library to determine the user identity, performs comparison authentication on the second identifier by using a current time of the second terminal, and if a time difference falls within a preset time range, determines that the comparison authentication succeeds and accepts the first request initiated by the first terminal. Subsequently, the second terminal encapsulates a third identifier used for representing an identity of the second terminal and the information identification code including the first identifier and the second identifier into a second request, and sends the second request to the server, so that the server performs validity authentication, then performs corresponding processing related to the target requirement, and sends a processing feedback to the first terminal. When the target requirement is subway travel, the first request is respectively a gate-entering request and a gate-exiting request, and the second terminal and the server respectively processes the gate-entering request and the gate-exiting request. When the target requirement is bus travel, the first request is only a ride request, and the second terminal and the server processes the ride request.

An embodiment of the present invention provides a server, including: a request receiving unit, configured to receive a second request initiated by a second terminal after the second terminal makes a response to a first request, the first request including an information identification code including a first identifier used for representing a user identity and a second identifier used for representing a generation time of the information identification code, the information identification code being generated according to a locally-stored preset policy when a response is made to a first operation, and the second request including a third identifier used to represent an identity of the second terminal and the information identification code including the first identifier and the second identifier; and an authentication processing unit, configured to perform validity authentication according to the received second request and then perform corresponding processing related to the target requirement.

In a subway travel scenario, in an implementation of this embodiment of the present invention, the authentication processing unit is further configured to parse the second request when the target requirement is subway travel, to obtain the third identifier and the information identification code including the first identifier and the second identifier; perform validity check on the information identification code, to determine authenticity of the information identification code, then parse the information identification code to obtain the first identifier, and update the first identifier to a gate-entering blacklist and a gate-exiting whitelist of the second terminal; and push, to a first terminal, information indicating that the first terminal has entered a gate.

In the subway travel scenario, in an implementation of this embodiment of the present invention, the request receiving unit is further configured to receive a third request. The third request includes the third identifier used for representing the identity of the second terminal, the information identification code including the first identifier and the second identifier, and bill information obtained according to the gate-entering request and the gate-exiting request. The authentication processing unit is further configured to: parse the third request to obtain the third identifier, the information identification code including the first identifier and the second identifier, and the bill information; perform validity check on the information identification code to determine authenticity of the information identification code, and initiate a payment request according to the bill information to complete payment processing related to subway travel; and parse the information identification code to obtain the first identifier, and delete the first identifier from the gate-entering blacklist and the gate-exiting whitelist.

In a bus travel scenario, in an implementation of the present invention, the request receiving unit is further configured to receive bill information obtained according to the ride request, where the bill information, as newly added information, is encapsulated into the second request. The authentication processing unit is further configured to: parse the second request when the target requirement is bus travel, to obtain the third identifier, the information identification code including the first identifier and the second identifier, and the bill information; and perform validity check on the information identification code to determine authenticity of the information identification code, and initiate a payment request according to the bill information to complete payment processing related to bus travel; and parse the information identification code to obtain the first identifier, update the first identifier to a malicious number blacklist if a user identified by the first identifier is a malicious user, and deliver the malicious number blacklist to the second terminal.

An embodiment of the present invention provides an information identification code-based information authentication system. The system includes: a first terminal 41, a second terminal 42, and a server 43. The first terminal 41 is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a first request according to the information identification code, to request the second terminal to perform identity authentication on the first terminal to satisfy a target requirement. The second terminal 42 is configured to: parse the information identification code in response to the first request to obtain the first identifier and the second identifier; perform comparison authentication on the first identifier by using a locally-stored preset information check library to determine the user identity; perform comparison authentication on the second identifier by using a current time of the second terminal; if a time difference falls within a preset time range, determine that the comparison authentication succeeds and accept the first request initiated by the first terminal; and encapsulate a third identifier used for representing an identity of the second terminal and the information identification code including the first identifier and the second identifier into a second request and send the second request to the server. The server 43 is configured to perform validity authentication according to the received second request, and then perform corresponding processing related to the target requirement.

According to this embodiment of the present invention, the first terminal side receives the first operation, and triggers, according to the first operation, the request for presenting the information identification code. The first terminal side generates an information identification code according to the locally-stored preset policy in response to the first operation. It should be noted that a manner of generating the information identification code is an offline manner, the terminal side does not need to interact with a background server, and no network is required. The information identification code carries the first identifier (for example, a UID) used for representing the user identity and the second identifier (for example, a timestamp) used for representing the generation time of the information identification code. The first terminal initiates the first request according to the information identification code carrying the first identifier (for example, the UID) and the second identifier (for example, the timestamp), to request, by using the first request, a second terminal to perform identity authentication on the first terminal to satisfy the target requirement. For example, in a subway scenario, the first terminal aligns the quick response code with an identification area on the second terminal for code scanning, to request the second terminal to allow the first terminal to enter a station through code scanning and subsequently exit from the station. A gate-entering blacklist and a gate-exiting whitelist are matched to use, so that identity authentication can be performed on the same user during station entering and exiting. After the authentication succeeds, a requirement of the user on subway travel is satisfied. For another example, in a bus scenario, the first terminal aligns the quick response code with an identification area on the second terminal for code scanning, to request the second terminal to scan the code of the first terminal. A malicious list is matched to use, and after identity authentication succeeds, a requirement of the user on bus travel is satisfied. Both in the subway scenario and the bus scenario, a gate performs comparison authentication by using the local information check library when being offline. In the bus scenario, the authentication is performed once, and in the subway scenario, the authentication is performed twice for station entering and station existing. As the manner for the information identification code is also an offline manner. In this embodiment of the present invention, a double-offline mechanism is used. A network condition does not need to be considered, no networking is required, and during subsequent payment, the payment is confirmed online after a delay. The second terminal parses the information identification code in response to the first request to obtain the first identifier (for example, the UID) and the second identifier (for example, the timestamp), and performs comparison authentication on the first identifier (for example, the UID) by using the locally-stored preset information check library to determine the user identity. The second terminal performs comparison authentication on the second identifier (for example, the timestamp) by using the current time of the second terminal. If the time difference falls within the preset time range (for example, one minute), the second terminal determines that the comparison authentication succeeds, and accepts the first request initiated by the first terminal (a mobile phone terminal). The second terminal encapsulates the third identifier (for example, a gate ID) used for representing the identity of the second terminal and the information identification code (for example, a quick response code) including the first identifier (the UID) and the second identifier (the timestamp) into the second request, and sends the second request to the server. The server performs validity authentication according to the received second request, and then performs payment processing related to the target requirement. The payment processing includes processing of direct bill deduction or collection initiation. If there is a balance in a user account, direct bill deduction is performed. If there is no balance in a user account, collection is initiated. If not performing payment, the user cannot use the application to generate a quick response code, that is, cannot implement ride travel (subway travel or bus travel).

According to this embodiment of the present invention, the double-offline mechanism is used, that is. (1) the quick response code is generated offline without online interaction with the background server; (2) the gate terminal performs local comparison authentication without online interaction with the background server. Asymmetric encryption is used, which differs from a technology related to for example. Alipay (where currently, an online solution through interaction with background is used). In the system, the mobile phone terminal, the gate terminal, and the background server are involved. In an actual application, the system is not limited to these execution entities interacted with each other.

Based on the foregoing embodiment, in an implementation of this embodiment of the present invention, the second terminal is further configured to decrypt, after the information identification code is encrypted by using a private key to obtain an encrypted information identification code, the encrypted information identification code by using a public key according to an asymmetric encryption and decryption policy, and parse the information identification code to obtain the first identifier and the second identifier.

Based on the foregoing embodiment, in an implementation of this embodiment of the present invention, the first terminal is further configured to request, when the target requirement is subway travel, the second terminal to allow the first terminal to enter a station through code scanning, where the first request initiated by the information identification code is a gate-entering request. The second terminal is further configured to: reject, if the first identifier is in a malicious number library, the gate-entering request initiated by the first terminal; reject, if the first identifier is in a gate-entering blacklist, the gate-entering request initiated by the first terminal; or accept, if the first identifier is neither in the malicious number library nor in the gate-entering blacklist, the gate-entering request initiated by the first terminal, and add the first identifier to the gate-entering blacklist.

Based on the foregoing embodiment, in an implementation of this embodiment of the present invention, the server is further configured to: parse the second request to obtain the third identifier and the information identification code including the first identifier and the second identifier; perform validity check on the information identification code to determine authenticity of the information identification code, then parse the information identification code to obtain the first identifier, and update the first identifier to a gate-entering blacklist and a gate-exiting whitelist of the second terminal; and push, to the first terminal, information indicating that the first terminal has entered a gate.

Based on the foregoing embodiment, in an implementation of this embodiment of the present invention, the first terminal is further configured to initiate a gate-exiting request according to the information identification code after the server pushes, to the first terminal, the information indicating that the first terminal has entered a gate, to request the second terminal to allow the first terminal to exit from the station through code scanning. The second terminal is further configured to: parse the gate-exiting request in response to the gate-exiting request to obtain the first identifier and the second identifier, and when performing comparison authentication on the first identifier by using the locally-stored preset information check library to determine the user identity, reject, if the first identifier is in the malicious number library, the gate-exiting request initiated by the first terminal; reject, if the first identifier is not in the gate-exiting whitelist, the gate-exiting request initiated by the first terminal; or perform comparison authentication on the second identifier by using a current time of the second terminal if the first identifier is in the gate-exiting whitelist, if a time difference falls within a preset time range, determine that the comparison authentication succeeds and accept the gate-exiting request initiated by the first terminal, and delete the first identifier from the gate-exiting whitelist.

Based on the foregoing embodiment, in an implementation of this embodiment of the present invention, the second terminal is further configured to encapsulate the third identifier used for representing the identity of the second terminal, the information identification code including the first identifier and the second identifier, and bill information obtained according to the gate-entering request and the gate-exiting request into a third request and send the third request to the server. The server is further configured to: parse the third request to obtain the third identifier, the information identification code including the first identifier and the second identifier, and the bill information; perform validity check on the information identification code to determine authenticity of the information identification code, and initiate a payment request according to the bill information to complete payment processing related to subway travel; and parse the information identification code to obtain the first identifier, and delete the first identifier from the gate-entering blacklist and the gate-exiting whitelist.

Based on the foregoing embodiment, in an implementation of this embodiment of the present invention, the first terminal is further configured to request, when the target requirement is bus travel, the second terminal to allow the first terminal to pass through code scanning, where the first request initiated according to the information identification code is a ride request. The second terminal is further configured to: reject, if the first identifier is in a malicious number library, the ride request initiated by the first terminal; or accept, if the first identifier is not in the malicious number library, the ride request initiated by the first terminal, and add the first identifier to a malicious number blacklist.

Based on the foregoing embodiment, in an implementation of this embodiment of the present invention, the server is further configured to: parse the second request after the bill information obtained according to the ride request is encapsulated into the second request and the second request is sent to the server, to obtain the third identifier, the information identification code including the first identifier and the second identifier, and the bill information; perform validity check on the information identification code to determine authenticity of the information identification code, and initiate a payment request according to the bill information to complete payment processing related to bus travel; and parse the information identification code to obtain the first identifier, update the first identifier to the malicious number blacklist if a user identified by the first identifier is a malicious user, and deliver the malicious number blacklist to the second terminal.

Based on the foregoing embodiment, using a subway scenario as an example, an embodiment of the present invention provides a quick response code-based information authentication system, including: a first terminal, a second terminal, and a server. The first terminal is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a gate-entering request or a gate-exiting request according to the information identification code, to request the second terminal to perform identity authentication on the first terminal to satisfy a target requirement on subway travel. The second terminal is configured to: parse the information identification code in response to the gate-entering request or the gate-exiting request to obtain the first identifier and the second identifier; perform comparison authentication on the first identifier by using a locally-stored preset information check library to determine the user identity; perform comparison authentication on the second identifier by using a current time of the second terminal, and if a time difference falls within a preset time range, determine that the comparison authentication succeeds and accept the gate-entering request or the gate-exiting request initiated by the first terminal; and encapsulate a third identifier used for representing an identity of the second terminal and the information identification code including the first identifier and the second identifier into a second request and send the second request to the server. The server is configured to perform validity authentication according to the received second request, and then perform corresponding processing related to the subway travel.

Based on the foregoing embodiment, using a bus scenario as an example, an embodiment of the present invention provides a quick response code-based information authentication system, including: a first terminal, a second terminal, and a server. The first terminal is configured to: receive a first operation, and trigger, according to the first operation, a request for presenting an information identification code; generate an information identification code according to a locally-stored preset policy in response to the first operation, the information identification code carrying a first identifier used for representing a user identity and a second identifier used for representing a generation time of the information identification code; and initiate a ride request according to the information identification code, to request the second terminal to perform identity authentication on the first terminal to satisfy a target requirement on bus travel. The second terminal is configured to: parse the information identification code in response to the ride request to obtain the first identifier and the second identifier; perform comparison authentication on the first identifier by using a locally-stored preset information check library to determine the user identity; perform comparison authentication on the second identifier by using a current time of the second terminal, and if a time difference falls within a preset time range, determine that the comparison authentication succeeds and accept the ride request initiated by the first terminal; and encapsulate a third identifier used for representing an identity of the second terminal and the information identification code including the first identifier and the second identifier into a second request and send the second request to the server. The server is configured to perform validity authentication according to the received second request, and then perform corresponding processing related to the bus travel.

For a processor configured to process data, during processing, a microprocessor, a central processing unit (CPU), a digital signal processor (DSP), or a field programmable gate array (FPGA) may be used for implementation. A storage medium includes an operation instruction. The operation instruction may be computer executable code. The steps in the procedure of the information processing method in the foregoing embodiments of the present invention are implemented by means of the operation instruction.

Figure 8:
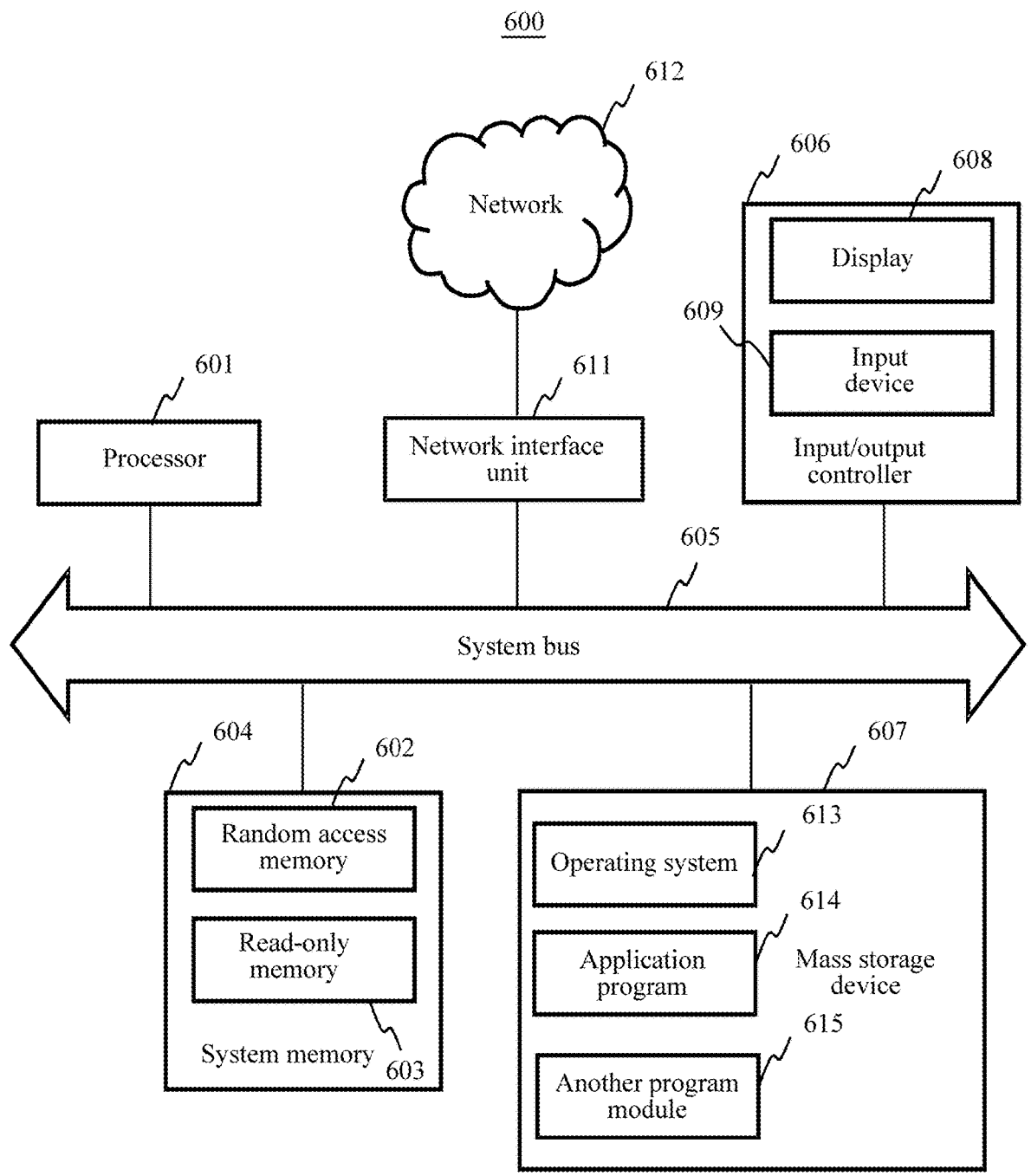
FIG. 8 is a schematic structural diagram of hardware of a terminal according to an embodiment of the present invention.

FIG. 8 is a schematic structural diagram 600 of hardware of a terminal according to an embodiment of the present invention. The terminal described in this embodiment includes a first terminal (for example, a mobile phone terminal) and a second terminal (a gate terminal). Both the first terminal and the second terminal may include a processor 601, a network interface unit 611, and a memory 604. The processor 601, the network interface unit 611, and the memory 603 may be connected via a bus or in another manner. Connection via a bus 605 is used as an example in this embodiment of the present invention. The processor 601, which may alternatively be referred to as a CPU, is a computing core and a control core of the terminal. Optionally, the network interface unit 611 may include a standard wired interface and a standard wireless interface (such as WiFi and a mobile communications interface), and is controlled by the processor 601 to be configured to send and receive data to and from a network 612. The memory 604 is a memory device of the terminal, and is configured to store a program and data and to have a random access memory 602 and a read-only memory 603 according to embodiments. It may be understood that the memory 604 herein may be a high-speed RAM, or may be a non-volatile memory, for example, at least one magnetic disk storage; or optionally, may be at least one storage apparatus located away from the processor 601. The memory 604 provides storage space. There is a system bus 605 for transporting data, and there is a mass storage device 607 having an operating system 613, application program 614 and another program module 615. There is also an input/output controller 606 including a display 608 and an input device 609.

In an embodiment, the terminal is applied to an information identification code-based information authentication system. A first terminal, a second terminal, and a server in the system each include one or more processors, a memory, and one or more programs. The one or more programs are stored in the memory, the program includes one or more modules each corresponding to a set of instructions, and the one or more processors are configured to execute the instructions.

The processor performs, based on the one or more programs in the memory, an information identification code-based information authentication method, including the following operations; receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; initiating, by the first terminal, a first request according to the information identification code, to request the second terminal to perform identity authentication on the first terminal to satisfy a target requirement; parsing, by the second terminal, the information identification code in response to the first request to obtain the first identifier and the second identifier; performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the first request initiated by the first terminal; encapsulating, by the second terminal, a third identifier used for representing an identity of the second terminal and the information identification code including the first identifier and the second identifier into a second request, and sending the second request to the server; and performing, by the server, validity authentication according to the received second request, and then performing corresponding processing related to the target requirement.

The processor performs, based on the one or more programs in the memory, the information identification code-based information authentication method, further including the following operations: encrypting the information identification code by using a private key, to obtain an encrypted information identification code; and decrypting, by the second terminal, in response to the first request, the encrypted information identification code by using a public key according to an asymmetric encryption and decryption policy, and parsing the information identification code to obtain the first identifier and the second identifier.

The processor performs, based on the one or more programs in the memory, the information identification code-based information authentication method, further including the following operations: requesting, when the target requirement is subway travel, the second terminal to allow the first terminal to enter a station through code scanning, where the first request initiated by the first terminal according to the information identification code is a gate-entering request; and in a process in which the second terminal performs comparison authentication on the first identifier by using the locally-stored preset information check library to determine the user identity, rejecting, by the second terminal if the first identifier is in a malicious number library, the gate-entering request initiated by the first terminal; rejecting, by the second terminal if the first identifier is in a gate-entering blacklist, the gate-entering request initiated by the first terminal; or accepting, by the second terminal if the first identifier is neither in the malicious number library nor in the gate-entering blacklist, the gate-entering request initiated by the first terminal, and adding the first identifier to the gate-entering blacklist.

The processor performs, based on the one or more programs in the memory, the information identification code-based information authentication method, further including the following operations: parsing, by the server, the second request to obtain the third identifier and the information identification code including the first identifier and the second identifier; performing, by the server, validity check on the information identification code to determine authenticity of the information identification code, parsing the information identification code to obtain the first identifier, and updating the first identifier to the gate-entering blacklist and a gate-exiting whitelist of the second terminal; and pushing, by the server to the first terminal, information indicating that the first terminal has entered a gate.

The processor performs, based on the one or more programs in the memory, the information identification code-based information authentication method, further including the following operations: initiating, by the first terminal, a gate-exiting request according to the information identification code after the server pushes, to the first terminal, the information indicating that the first terminal has entered a gate, to request the second terminal to allow the first terminal to exit from the station through code scanning; parsing, by the second terminal, the gate-exiting request in response to the gate-exiting request to obtain the first identifier and the second identifier; and when the second terminal performs comparison authentication on the first identifier by using the locally-stored preset information check library to determine the user identity, rejecting, by the second terminal if the first identifier is in the malicious number library, the gate-exiting request initiated by the first terminal; rejecting, by the second terminal if the first identifier is not in the gate-exiting whitelist, the gate-exiting request initiated by the first terminal; or performing, by the second terminal if the first identifier is in the gate-exiting whitelist, comparison authentication on the second identifier by using the current time of the second terminal for authentication, if the time difference falls within the preset time range, determining that the comparison authentication succeeds and accepting the gate-exiting request initiated by the first terminal, and deleting the first identifier from the gate-exiting whitelist.

The processor performs, based on the one or more programs in the memory, the information identification code-based information authentication method, further including the following operations: encapsulating, by the second terminal, the third identifier used for representing the identity of the second terminal, the information identification code including the first identifier and the second identifier, and bill information obtained according to the gate-entering request and the gate-exiting request into a third request, and sending the third request to the server; parsing, by the server, the third request to obtain the third identifier, the information identification code including the first identifier and the second identifier, and the bill information; performing, by the server, validity check on the information identification code to determine authenticity of the information identification code, and then initiating a payment request according to the bill information to complete payment processing related to the subway travel; and parsing the information identification code to obtain the first identifier, and deleting the first identifier from the gate-entering blacklist and the gate-exiting whitelist.

The processor performs, based on the one or more programs in the memory, the information identification code-based information authentication method, further including the following operations: requesting, when the target requirement is bus travel, the second terminal to allow the first terminal to pass through code scanning, where the first request initiated by the first terminal according to the information identification code is a ride request; and in a process in which the second terminal performs the comparison authentication on the first identifier by using the locally-stored preset information check library to determine the user identity, rejecting, by the second terminal if the first identifier is in a malicious number library, the ride request initiated by the first terminal; or accepting, by the second terminal if the first identifier is not in the malicious number library, the ride request initiated by the first terminal, and adding the first identifier to a malicious number blacklist.

The processor performs, based on the one or more programs in the memory, the information identification code-based information authentication method, further including the following operations: encapsulating bill information obtained according to the ride request into a second request, and sending the second request to the server; parsing, by the server, the second request to obtain the third identifier, the information identification code including the first identifier and the second identifier, and the bill information; performing, by the server, validity check on the information identification code to determine authenticity of the information identification code, and then initiating a payment request according to the bill information to completer payment processing related to the bus travel; and parsing, by the server, the information identification code to obtain the first identifier, updating the first identifier to the malicious number blacklist if a user identified by the first identifier is a malicious user, and delivering the malicious number blacklist to the second terminal.

In an embodiment, the terminal is applied to an information identification code-based information authentication system. A first terminal, a second terminal, and a server in the system each include one or more processors, a memory, and one or more programs. The one or more programs are stored in the memory, the program includes one or more modules each corresponding to a set of instructions, and the one or more processors are configured to execute the instructions.

The processor performs, based on the one or more programs in the memory, an information identification code-based information authentication method, including the following operations: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; initiating, by the first terminal, a gate-entering request or a gate-exiting request according to the information identification code, to request the second terminal to perform identity authentication on the first terminal to satisfy a target requirement on subway travel; parsing, by the second terminal, the information identification code in response to the gate-entering request or the gate-exiting request to obtain the first identifier and the second identifier, performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the gate-entering request or the gate-exiting request initiated by the first terminal; encapsulating, by the second terminal, a third identifier used for representing an identity of the second terminal and the information identification code including the first identifier and the second identifier into a second request, and sending the second request to the server, and performing, by the server, validity authentication according to the received second request, and then performing corresponding processing related to the subway travel.

In an embodiment, the terminal is applied to an information identification code-based information authentication system. A first terminal, a second terminal, and a server in the system each include one or more processors, a memory, and one or more programs. The one or more programs are stored in the memory, the program includes one or more modules each corresponding to a set of instructions, and the one or more processors are configured to execute the instructions.

The processor performs, based on the one or more programs in the memory, an information identification code-based information authentication method, including the following operations: receiving, by the first terminal side, a first operation, and triggering, according to the first operation, a request for presenting an information identification code; generating, by the first terminal side, an information identification code according to a locally-stored preset policy in response to the first operation, the information identification code carrying a first identifier used for representing a user identity and a second identifier used for representing a generation time of the information identification code; and initiating, by the first terminal, a ride request according to the information identification code, to request the second terminal to perform identity authentication on the first terminal to satisfy a target requirement on bus travel; parsing, by the second terminal, the information identification code in response to the ride request to obtain the first identifier and the second identifier; performing, by the second terminal, comparison authentication on the first identifier by using a locally-stored preset information check library to determine a user identity; performing, by the second terminal, comparison authentication on the second identifier by using a current time of the second terminal, and if a time difference falls within a preset time range, determining that the comparison authentication succeeds and accepting the ride request initiated by the first terminal; encapsulating, by the second terminal, a third identifier used for representing an identity of the second terminal and the information identification code including the first identifier and the second identifier into a second request, and sending the second request to the server; and performing, by the server, validity authentication according to the received second request, and then performing corresponding processing related to the bus travel.

An embodiment of this application provides a computer storage medium, storing a computer executable instruction. The computer executable instruction is used for performing the foregoing information identification code-based information authentication method in the embodiments of the present invention.

It should be noted herein that the descriptions related to the terminal and the server are similar to the descriptions of the foregoing method. The descriptions of beneficial effects of the terminal and the server are the same as that of the method, and details are not described again. For technical details of the terminal and the server that are not disclosed in the present disclosure, refer to the content described in the embodiments of the method procedures in the present disclosure.

The embodiments of the present invention are described below by using a real application scenario as an example:

For various problems caused by online check of transportation travel such as subway travel and bus travel in the existing technology, an embodiment of the present invention is used. Scenarios of subway travel and bus travel are distinguished and are respectively described as follows:

A "transportation code" in the following descriptions refers to a character string used for replacing a user to initiate a payment request to QQ payment background, includes purchaser identification information UID, a payment manner, a timestamp, and security check information, and is presented in a form of a quick response code. The "UID" is a user identification identifier, and each user has a unique UID. In this embodiment of the present invention, a specific form of expression of the transportation code is a quick response code, and details are not described.

Scenario one: In a subway travel scenario, a double offline solution (where authentication is performed twice) in which a quick response code is used for taking a subway and quickly passing through a gate is used.

In the scenario to which this embodiment of the present invention is applied, the transportation code (whose specific form of expression of the transportation code is a quick response code) is used as a certificate for taking a subway. Currently, a physical one-way ticket or a physical One-Card is required for taking a subway. In the scenario, it is equivalent to virtualize a physical ride certificate and put the certificate into a carry-on mobile phone. In this way, it is convenient in use, and a user does not need to line up to buy a ticket.

A double offline authentication mechanism is used. During pass-through from a gate, the mobile phone is offline, and the gate is also offline. During the pass-through from the gate, the offline manner is used, to maximally ensure quickness and stability (where 300 ms is required by the transportation department) of a user during the pass-through from the gate. If online authentication is used, a time of 300 ms is impossible to reach. After the pass-through from the gate, transportation code information of the user is then sent to a background server for validity authentication. If the user is an unauthorized user, the user is not allowed to pass through when exiting from a gate, thereby implementing both security in quickness and security in cash. Gate intellectualization is implemented. A complete security authentication mechanism set is formed in cooperation with a gate hardware device maker, to ensure security of offline authentication of the quick response code and reliability of an authentication manner.

In a scenario in which a user takes a subway, the foregoing mechanism is carried in a QQ application (APP), a transportation code is generated by using a QQ client, and a gate scans the transportation code, to implement quick gate pass-through and charging. A specific operation interaction includes: (1) a provisioning procedure, where a user needs to apply for a local One-Card, and it is equivalent to energize or use the One-Card, as shown in the displays 300 in FIG. 3; (2) a transportation code is presented after the application succeeds, so that the user can enter and exit from a gate through code scanning, and bill deduction is performed after gate exiting, as shown in displays 400 in FIG. 4. The entire interaction procedure is easy in operation and is clear, a user use threshold is low, and user experience is consistent with that of swiping a quick response code currently.

The double offline solution in which a quick response code is used for taking a subway and quickly passing through a gate includes the following content:

1. Composition of a quick response code (1) Encoded character set: data in a form of alphabets and digits (digits 0 to 9, capital alphabets A to Z, and 9 other characters: space. $, %, *, +, −, ., /, and :).

(2) Data composition: A quick response code is a character string having a length of 148 that is obtained through Base64 conversion of 111 bytes, where Base64 plaintext data is shown in Table 1:

TABLE 1

| Content | Length (byte) | Type | Description |
|---|---|---|---|
| Certificate data | Variable | BIN | See the part "certificate data" |
| Times tamp authentication data | 8 | BIN | See the part "timestamp" |
| TAC | 4 | BIN | See the part "transaction authentication code" |

(3) Certificate data: A certificate includes certificate plaintext and signature data, as shown in Table 2:

TABLE 2

| Content | Length (byte) | Type | Description |
|---|---|---|---|
| Certificate plaintext | Variable | BIN | A length is 32 bytes<br>Signature authentication is directly performed on the certificate plaintext<br>For specific content, refer to the part "certificate plaintext" |
| Signature data | 64 | BIN | A publisher signs a MD5 value of a certificate plaintext signature by using a 256-bit SM2 private key.<br>For descriptions of an SM2 algorithm, refer to <Announcement No. 21 of the State Cryptography Administration> |
| Total | Variable | | |

The certificate plaintext data is shown in Table 3:

TABLE 3

| Content | Length (byte) | Type | Description |
|---|---|---|---|
| Identification code | 3 | Character | Fixed "YKT"<br>Used for screening out other quick response codes |
| Certificate version | 1 | BCD | Certificate application version<br>Corresponding to a terminal rule version<br>A current version is 01 |
| UIID | 3 | BCD | Certificate issuer identifier<br>First and second bits: Industry type<br>00: Urban One-Card<br>01: Bank<br>02: Third-party payment<br>Third to sixth bits: Sequence number<br>The industry of the urban One-Card is a city code, and 0 is complemented when a number of bits is less than 4 |
| User ID | 8 | BCD | ID number for identifying a user identity<br>Unique for a single certificate issuer |
| Certificate issue time | 4 | HEX | UNIX time value |
| Certificate expiration time | 4 | HEX | Unit: 30 minutes |
| Quick response code expiration time | 1 | HEX | Unit: minute |
| Key version | 1 | HEX | |
| Application range | 2 | HEX | 16 bits in total<br>0: Unauthorized<br>1: Authorized<br>First bit: Bus<br>Second bit: Subway<br>Third bit: Vegetable market<br>Fourth bit: Small-sized shop<br>Fifth bit: Supermarket<br>Sixth bit: Economical fast food<br>Seventh bit: Catering<br>Eighth bit: Vending machine<br>Ninth to $16^{th}$ bits: Reserved |
| Single overdraft limit | 2 | HEX | Unit: Yuan |
| Publisher data length | 2 | HEX | |
| Publisher data | | | |

(4) Timestamp authentication data, as shown in Table 4:

TABLE 4

| Content | Length (byte) | Type | Description |
|---|---|---|---|
| Timestamp | 7 | BCD | YYYYMMDDDDhhmmss |
| MAC | 4 | BIN | Level-1 diversification is performed on the latter five bytes of a UIID + a user ID by using a timestamp master key, and then level-2 diversification is performed on a certificate issue date + a certificate expiration date, to obtain a diversified authentication key; four bytes of the certificate issue date + four bytes of a timestamp are encrypted by using the diversified authentication key, to select the latter four bytes |

(5) Transaction authentication code (TAC), as shown in Table 5:

TABLE 5

| TAC | 4 | BIN | Four bytes of a certificate issue date + four bytes of a timestamp are encrypted by using a TAC key to select the latter four bytes |
|---|---|---|---|

2. Transportation Code Identification and Authentication Mechanism

Figure 5:
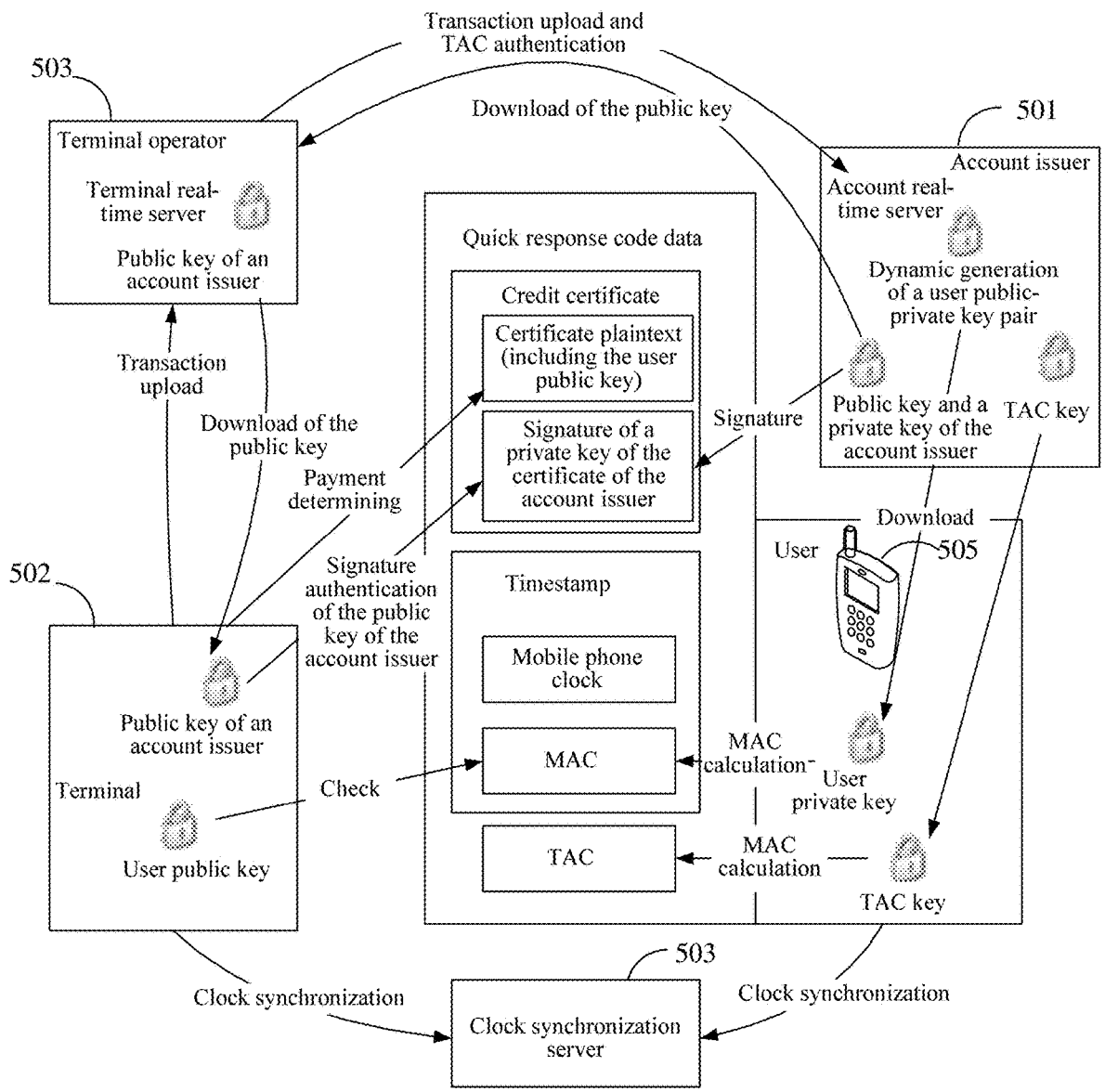
FIG. 5 is a schematic diagram of an asymmetric encryption scenario according to an embodiment of the present invention.

A gate needs to identify a transportation code through code scanning and authenticate the transportation code. The authentication includes authentication of information such as timestamp information, certificate signature information, and a user identity. An account issuer refers to a background server, a terminal operator may be a card corporation, a subway/bus corporation, or a third-party serving corporation in each region, a terminal refers to a gate machine, and a mobile phone refers to a QQ APP. A specific authentication mechanism 500 is shown in FIG. 5. The account issuer 501 dynamically generates a user private-public key pair, and generates a TAC key. The user APP (for example, WeChat or QQ) applies to the account issuer for a user certificate and downloads a user private key and the TAC key that are required for generating a quick response code. The terminal (a code scanning machine) 502 downloads the public key of the account issuer and a user public key to authenticate a user certificate and a timestamp MAC. The terminal operator 503 is responsible for collection and upload of transaction and transparent transmission of the public key. A clock synchronization server 504 needs to maintain persistent synchronization between the terminal 502 and the user 505 through alignment. A certificate signed by using the private key of the account issuer 501 can only be decrypted by using the corresponding public key of the account publisher in the terminal, timestamp data encrypted by using the private key of the user APP can only be decrypted by using the user public key in the terminal machine, to ensure transaction security in combination with uniqueness of the TAC code. It should be noted that, the terminal 502 confirms the real identity of the user 505 and credit information by using the certificate authentication mechanism. The account issuer 501 authenticates the TAC to determine authenticity of the quick response code presented by the user. The terminal 502 authenticates the timestamp MAC to improve difficulty and costs of replication and theft of the quick response code. To ensure consistency of the timestamp authentication data, the mobile phone APP and the terminal 502 need to perform clock synchronization by using the same server. The account issuer 501 is responsible for maintaining security of a certificate private key, a MAC subkey, and the TAC key. The terminal operator 503 is responsible for security of a MAC root key and trueness and accuracy of a payment authentication procedure.

3. Logic of Offline Authentication

Figure 6:
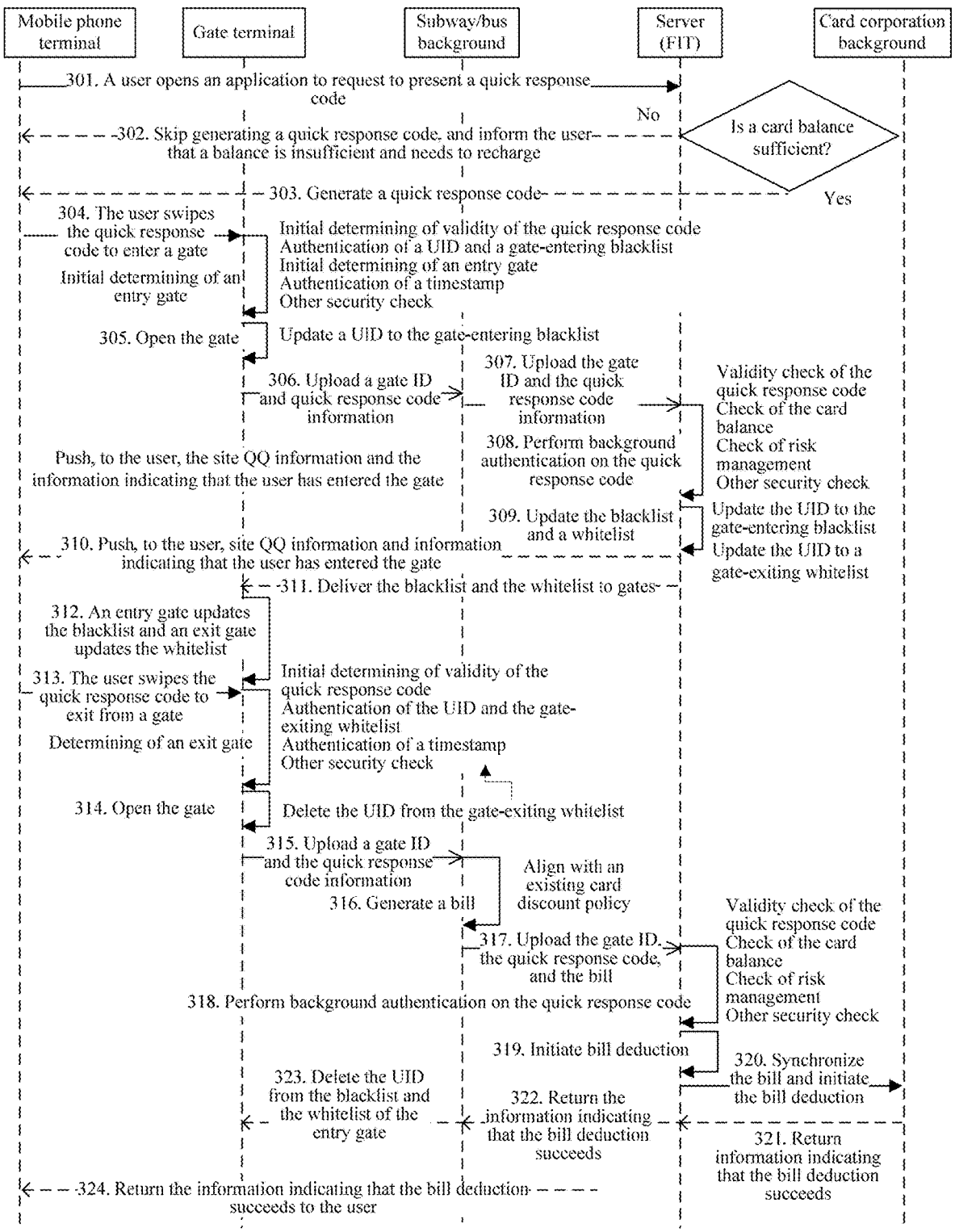
FIG. 6 is a schematic flowchart of a subway travel scenario according to an embodiment of the present invention.

Logic of gate authentication and interpretation of a transportation code gate and a procedure 601 of delayed authentication of a background server are shown in FIG. 6. The following steps are included:

Step 301: A user opens an application to request to present a quick response code.

Step 302: Possibly prevent generating a quick response code when a card balance is insufficient, and inform the user that the balance is insufficient and needs to recharge.

Step 303: Generate a quick response code.

Step 304: The user swipes the quick response code to enter a gate.

Authentication performed when the quick response code is swiped to enter the gate herein includes: initial determining of validity of the quick response code, authentication of a UID and a gate-entering blacklist, authentication of a timestamp, other security check, and the like.

Step 305: Open the gate, and then update a UID to a gate-entering blacklist.

Step 306 and step 307: Upload a gate ID and quick response code information.

Step 308: Perform background authentication on the quick response code.

The authentication herein includes: validity check of the quick response code, check of the card balance, check of risk management, other security check, and the like.

Step 309: Update the blacklist and a whitelist, where specifically, the UID is updated to the gate-entering blacklist and a gate-exiting whitelist.

Step 310: Push, to the user, site QQ information and information indicating that the user has entered the gate.

Step 311: Deliver the blacklist and the whitelist to gates.

Step 312: An entry gate updates the blacklist and an exit gate updates the whitelist.

Step 313: The user swipes the quick response code to exit from a gate.

Authentication performed when the quick response code is swiped to exit from the gate herein includes: initial determining of the validity of the quick response code, authentication of the UID and the gate-exiting whitelist, authentication of the timestamp, other security check, and the like.

Step 314 to step 316: Open the gate, then upload a gate ID and the quick response code information, and generate a bill.

Step 317: Upload the gate ID, the quick response code, and the bill.

Step 318: Perform background authentication on the quick response code.

The authentication herein includes: validity check of the quick response code, check of the card balance, check of risk management, other security check, and the like.

Step 319 and step 320: Initiate bill deduction, synchronize the bill, and initiate the bill deduction.

Step 321 to step 324: Return information indicating that the bill deduction succeeds, delete the UID from the blacklist and the whitelist of the entry gate, and return the information indicating that the bill deduction succeeds to the user.

In the application scenario, for a check mechanism of the gate, the gate is offline when determining whether the user passes through, but needs to perform delayed networking after allowing the user to pass through, to upload user data and the gate ID to subway/bus background and then to the background server for data check and parsing.

In the application scenario, the gate is required to be offline during determining. Therefore, a gate-entering blacklist mechanism and a gate-exiting whitelist mechanism are introduced.

For the gate-entering blacklist, a blacklist is set during gate entering. After a user passes through the gate, a UID of the user is added to the blacklist, and the blacklist is delivered by using a local area network of a subway corporation or the background server, to synchronize the blacklist to all entry gates. When no instruction from the server end is received, the blacklist also needs to be regularly updated. Data existing over a time (for example, two hours) in the blacklist is all cleared.

For the gate-exiting whitelist, in a subway scenario, after a user passes through an entry gate, and after the background server determines that the quick response code is available, a UID of the user is delivered to whitelists of all exit gates. Only a user in the whitelist can exit from a gate. After the user exits from the gate, and after bill deduction initiated by the background succeeds, this transaction is completed. The background sends an instruction, to delete the user from both the blacklist and the whitelist. The whitelist also needs to be regularly updated, specifically subject to the longest duration of stay that is allowed by the subway corporation.

For the malicious list, when detecting that a user is a malicious user or may maliciously propagate a transportation code, the background server adds a UID of the user to the malicious list, delivers the malicious list to all gates, and no longer generates a transportation code for the user. The blacklist effectively avoids a risk that the quick response code is massively repeated and gate entering is repeatedly performed. For the whitelist, an existing bus card mechanism is imitated, only a user entering a gate through code scanning using a QQ wallet can exit from a gate in the same manner. Similarly, for those unauthorized users having entered a gate or users whose balances are insufficient and that have entered a gate, whether the users can exit from a gate is flexibly controlled by using the whitelist after determining of the background. The malicious list can effectively avoid a risk that a malicious user thieves or distributes a transportation code, thereby ensuring cash security of the user.

In the application scenario, after decrypting the quick response code by using a public key, the entry gate needs to perform the following check:

(1) user identification information (UID): used for determining a user identity and determining whether the user is in the blacklist or the malicious name, where if yes, the user is not allowed to pass through;

(2) QQ quick response code transportation payment check information, used for distinguishing from other products of the same type; and user timestamp information, used for notifying the gate of a generation time of the quick response code, where pass-through is allowed only when a quick response code is generated within one minute; and (3) security check information: including a complex algorithm, where pass-through is allowed only when initial security check succeeds.

In the application scenario, after decrypting the quick response code by using a public key, the exit gate needs to perform the following check:

(1) user identification information (UID), used for determining a user identity, where if the user is not in the whitelist, the user is not allowed to pass through;

(2) QQ quick response code transportation payment check information, used for distinguishing from other products of the same type;

(3) user timestamp information, used for notifying the gate of a generation time of the quick response code, where pass-through is allowed only when a quick response code is generated within one minute; and (4) security check information: including a complex algorithm, where pass-through is allowed only when initial security check succeeds.

In the application scenario, check of the background server is determining of validity of a payment request that is performed after the server receives the user quick response code data and the gate ID from the subway, and includes the following:

(1) integrity determining of the payment request, to determine whether all necessary information is included;

(2) whether a merchant is authorized;

(3) whether merchant information and purchaser information are correct;

(4) whether an order status has been closed or paid;

(5) whether the quick response code is a transportation code for subway/bus payment;

(6) whether the quick response code has expired;

(7) whether the account balance of the user is sufficient;

(8) determining of the gate ID information;

(9) determining of risk management information, mainly including a quantity of times and a limit of one-day consumption, an anti-fraud policy, and whether password verification is required; and

(10) the server maintains the gate blacklist and whitelist mechanism, determines validity of the user the quick response code data, initiates a bill deduction request, and pushes a related QQ message.

In the application scenario, during processing of an exception, a risk that the transportation code is massively replicated needs to be avoided. The transportation code is essentially a quick response code, and is easier to be replicated and propagated than a NFC. In addition, during offline authentication, if the transportation code is massively replicated, a serious consequence may be caused. Therefore, for this case, the following measures are taken in the scenario:

(1) Timestamp authentication: The transportation code includes timestamp information, and the gate first performs initial determining. If the transportation code is generated one minute ago, pass-through is rejected.

(2) Gate-entering blacklist mechanism: In a subway scenario, after a user enters a gate by using a transportation code, the gate obtains user UID information through parsing, and uploads the user UID information to subway background and then to the background server. After it is determined that the user is authorized and the transportation code is valid, the user UID is delivered to blacklists of all entry gates by using the subway background. Later, all gate entering applications of the user are rejected until the blacklist expires and is invalidated (two hours) or a user gate exiting record is detected.

(3) In a bus scenario, a transportation code of a user having entered a gate is added to a blacklist of a gate terminal of a bus, and the transportation code is rejected to be used again. In addition, if a malicious user is detected, a UID of the user is added to the gate blacklist. The user is prohibited to enter a gate by using all transportation codes that are already generated, and no new quick response code is generated for the user. Duration of validity of the blacklist is also two hours.

(4) Threshold entry background server review: If detecting that a user has lots of gate entering records (≥three times) within a short time, for example, within 10 minutes (where the blacklist may not be validated), the background server adds a UID of the user to a malicious list, and stops generating a new transportation code for the user.

In the application scenario, during processing of an exception, a risk that a user enters and exits from a gate by using different UIDs needs to be avoided. In a subway environment, a risk that a transportation code of a user A is used for entering a gate and a transportation code of a user B is used for exiting from a gate exists. Consequently, the background can neither determine a route of the user nor form a bill for bill deduction. Therefore, a gate-exiting whitelist mechanism is introduced:

Gate-exiting whitelist mechanism: After a user UID obtained by an entry gate through parsing is reported to the background server, and after it is determined that the user UID is valid through authorization determining, the user UID is updated to whitelists of all exit gates. Pass-through from an exit gate is allowed only when a UID is in the whitelist. In addition, after the user exits from a gate, the UID of the user is deleted from the blacklist and the whitelist. Validity of the whitelist is determined according to a specific subway environment of each city, and is temporally determined as two hours. In this way, it is ensured that a user is allowed to exit from a gate only when having a gate entering record, which is consistent with experience using a one-way ticket and a One-Card.

In the application scenario, during processing of an exception, a risk that a user enters a gate in a conventional manner and exits from a gate by using a transportation code needs to be avoided. There is a case in which a user enters a gate by using a one-way ticket or a One-Card but attempts to exit from a gate by using a transportation code. This case can also be processed by using the gate-exiting whitelist mechanism.

In the application scenario, during processing of an exception, a risk that a user enters a gate by using a transportation code and does not exit from a gate by using the transportation code needs to be avoided. There is a case in which a user enters a gate by using a transportation code and exits from a gate by using a one-way ticket or a One-Card. In this case, the user cannot exit from the gate, and can only exit from the gate by using the transportation code or through processing of a subway staff service. This case is similar to a case in which the user enters a gate by using a one-way ticket or a One-Card but the one-way ticket or the One-Card gets lost, and only processing of a subway staff service is available. However, this solution is more advantageous, because one piece of gate entering information including an entry subway station is pushed to the user after the user enters the gate and may be used as a certificate when the user exits from the gate through processing of the staff service, to avoid a credit risk and reduce loss of the user.

In the application scenario, during processing of an exception, a risk that a user enters a gate by using a transportation code and then a mobile phone is out of power needs to be avoided. There is a case in which a user enters a gate by using a transportation code and then a mobile phone is out of power. This case is similar to a conventional case in which a one-way ticket or a One-Card gets lost. Gate exiting can only be implemented through processing of a subway station staff service. However, in this solution, after the user opens a transportation code presentation interface, recognition of a quantity of electricity of the mobile phone of the user may be added. When it is recognized that the quantity of electricity of the mobile phone is lower than a particular value (for example, 10%), the mobile phone is informed that the mobile phone needs to remain power-unexhausted when the transportation code is swiped by a gate.

In the application scenario, during processing of an exception, a risk that a user enters a gate by using a transportation code but cannot exit from a gate needs to be avoided. There is a case in which a user enters a gate by using a transportation code but a gate-exiting whitelist is not updated in time due to a network delay. A policy in this case is prompting the user to try again later and updating and delivering the whitelist in background. If the case is caused due to a gate network failure, a detection mechanism needs to be added in this case. After it is recognized that a gate has a problem, processing is performed in time. After the user enters the gate by using the transportation code, there is no order processing of a gate exiting record within a time. Due to that a destination subway station temporally does not support gate exiting performed through code scanning, or due to inconvenience, or due to no electricity of the mobile phone, after entering the gate, the user selects to exit from a gate through processing of a subway station staff service. However, the user wants to enter a gate by using a transportation code within two hours, because the user is still in the gate-entering blacklist, the following measures are required:

(1) The bus and the subway do not share a blacklist. A gate-entering blacklist of the subway and a gate-entering blacklist of the bus are non-exchangeable and are respectively maintained. In this way, after exiting from a station through processing of a subway station staff service, the user can quickly change to a bus by using a transportation code.

(2) An operation performed by the user to independently complete a route is added. A mark of station exiting through processing of a staff service is added to a record indicating that the user has entered a station for ride. After the user mark is completed, the user is deleted from the blacklist. In addition, to reduce impact caused by an erroneous operation of the user, the whitelist is not deleted.

In the application scenario, during processing of an exception, a risk that a user stops using a transportation code before bill deduction needs to be avoided. When a user selects to stop using a transportation code before bill deduction in a route or after exiting from a station, a prompt needs to be popped up to indicate that use of the transportation code can be stopped only after the bill deduction succeeds and settlement is completed.

In the application scenario, during processing of an exception, a risk that an account balance of a user is insufficient to pay for travel needs to be avoided. There is a case in which a user finds out that an account balance is sufficient to pay for a route after the route is completed. For this case, the following method is used:

(1) Confirmation in advance: If it is found out that the balance of the user is insufficient to complete the longest route, the user is not allowed to present a transportation code and is prompted to recharge.

(2) Collection: A manner such as push of a QQ message for collection, association with Tencent credit or bank credit, or bill deduction performed on a bound bank card of the user is used for collection of arrears of the user.

(3) Collection mode: If the user has no arrears, a transportation code is presented to the user. If having arrears in a route, the user needs to recharge before next use, otherwise, no transportation code is presented. A disbursement or bad debt risk may be caused, and a bank or an insurance company needs to be introduced for saving.

In the application scenario, during processing of an exception, a risk that a transportation code generation mechanism is cracked needs to be avoided. There is a risk that a transportation code generation mechanism is cracked and used by an ill-intentioned person. For this case, a policy is: (1) Introduction of asymmetric encryption: The transportation code is encrypted by using an asymmetric encryption mechanism, a private key is in the background server, and a public key is in a gate. In addition, regular update (24 hours) may be performed as required. In this way, a risk that a quick response code is cracked is maximally avoided. (2) Blacklist and whitelist mechanism: If detecting that a quick response code is forged, the background server does not add the UID to the whitelist.

In the application scenario, according to this embodiment of the present invention, a user can take a bus or subway by using any mobile phone, and this embodiment of the present invention is applicable to mobile phones of all models and mechanisms. The user can quickly and conveniently pass through a subway/bus gate by using a transportation code, which is consistent with experience of passing through a gate by using a physical One-Card (NFC): operation costs of cards, the subway corporation, and the bus corporation are reduced; it is greatly convenient for the user to apply for a transportation card into a mobile phone anytime and anywhere without lining up for purchase, and deposit is not required; the QQ wallet is used as a payment channel of the user, and therefore cash is secure and a settlement procedure is clear; digital construction is implemented, and travel data of the user is collected with big data, to help a related department to properly configure resources, so that configuration of transportation resources is more proper and travel is quicker and more convenient. In addition to the foregoing double offline solution, a semi-offline solution may alternatively be used. That is, when a network connection is available, a manner in which a gate performs online authentication in real time may be used, and quick and secure authentication of the gate can also be implemented. A solution of credit payment saving may alternatively be used. That is, a mode in which a gate does not need to perform excessive security authentication and only needs to extract UID information of user after scanning and subsequently gather bill deduction is used. Credit endorsement of the user is required herein.

Scenario two: In a bus travel scenario, a double offline solution (where authentication is performed once) in which a quick response code is used for taking a bus and quickly passing through a gate is used.

In the scenario to which this embodiment of the present invention is applied, the transportation code (whose specific form of expression of the transportation code is a quick response code) is used as a certificate for taking a bus. Currently, cash or a One-Card is required for taking a bus. In the scenario, it is equivalent to virtualize a physical ride certificate and put the certificate into a carry-on mobile phone. In this way, it is convenient in use, and a user does not need to line up to buy a ticket.

A double offline authentication mechanism is used. During pass-through from a gate, the mobile phone is offline, and the gate is also offline. During the pass-through from the gate, the offline manner is used, to maximally ensure quickness and stability (where 300 ms is required by the transportation department) of a user during the pass-through from the gate. If online authentication is used, a time of 300 ms is impossible to reach. After the pass-through from the gate, transportation code information of the user is then sent to a background server for validity authentication. If the user is an unauthorized user, the user is added to a malicious list. In this solution, both security in quickness and security in cash are implemented. Gate intellectualization is implemented. In the present disclosure, a complete security authentication mechanism set is created in cooperation with a gate hardware device maker, to ensure security of offline authentication of the quick response code and reliability of an authentication manner.

Figure 3:
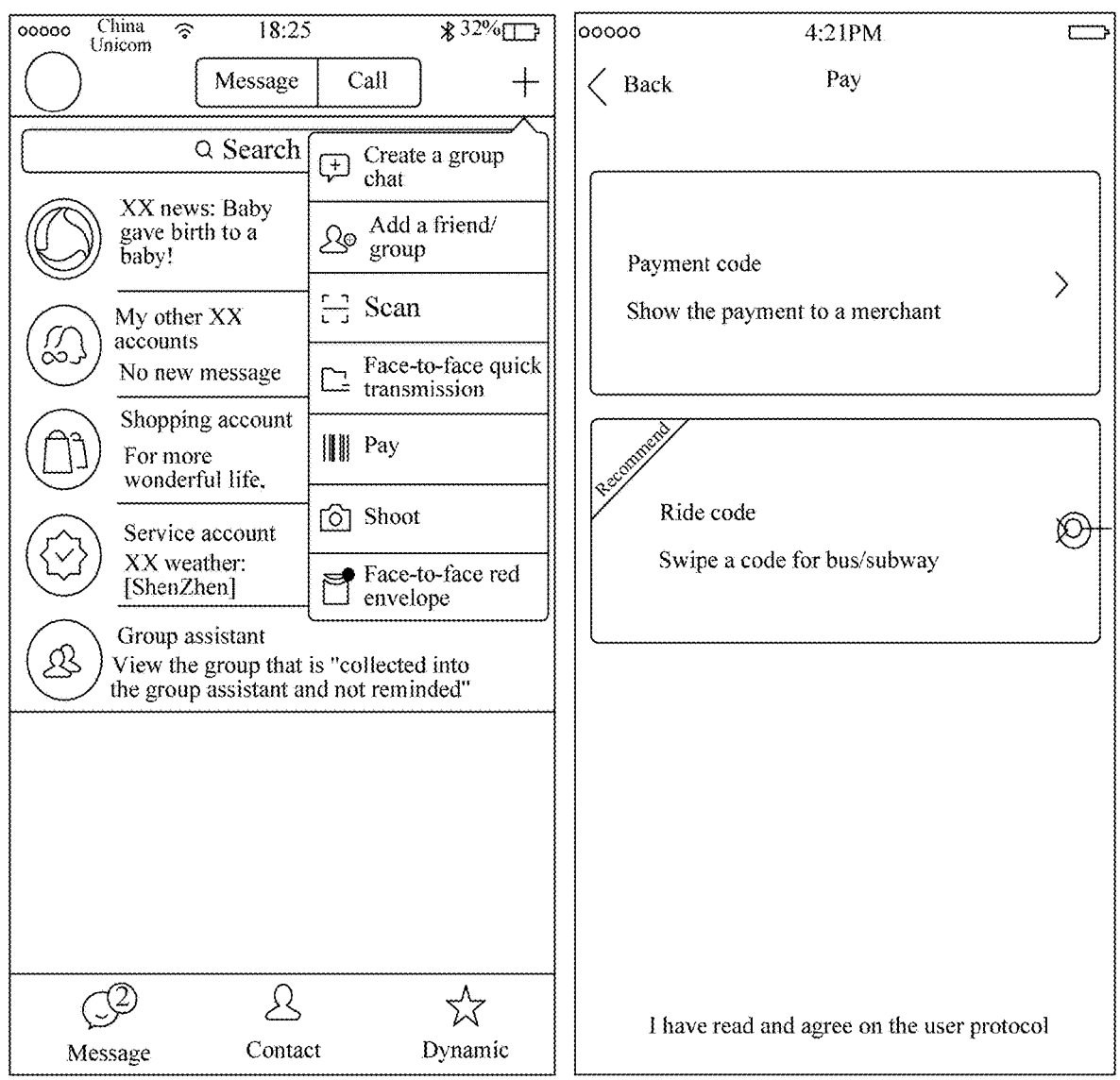
FIG. 3 is a schematic diagram of a service provisioning UI interface in a scenario according to an embodiment of the present invention.
Figure 4:
FIG. 4 is a schematic diagram of a fee deduction UI interface in a scenario according to an embodiment of the present invention.

In a scenario in which a user takes a bus, the foregoing mechanism is carried in a QQ APP, a transportation code is generated by using a QQ client, and a gate scans the transportation code, to implement quick gate pass-through and charging. A specific operation interaction includes: (1) a provisioning procedure, where a user needs to apply for a local One-Card, and it is equivalent to energize or use the One-Card, as shown in FIG. 3; (2) a transportation code is presented after the application succeeds, so that the user can enter and exit from a gate through code scanning, and bill deduction is performed after gate exiting, as shown in FIG. 4. The entire interaction procedure is easy in operation and is clear, a user use threshold is low, and user experience is consistent with that of swiping a quick response code currently.

The double offline solution in which a quick response code is used for taking a bus and quickly passing through a gate includes the following content:

1. Composition of a Quick Response Code (1) Encoded character set: data in a form of alphabets and digits (digits 0 to 9, capital alphabets A to Z, and 9 other characters: space, $, %, *, +, −, ., /, and :).

(2) Data composition: A quick response code is a character string having a length of 148 that is obtained through Base64 conversion of 111 bytes, where Base64 plaintext data is shown in Table 6:

TABLE 6

| Content | Length (byte) | Type | Description |
| --- | --- | --- | --- |
| Certificate data | Variable | BIN | See the part "certificate data" |
| Timestamp authentication data | 8 | BIN | See the part "timestamp" |
| TAC | 4 | BIN | See the part "transaction authentication code" |

(3) Certificate data: A certificate includes certificate plaintext and signature data, as shown in Table 7:

TABLE 7

| Content | Length (byte) | Type | Description |
|---|---|---|---|
| Certificate plaintext | Variable | BIN | A length is 32 bytes<br>Signature authentication is directly performed on the certificate plaintext<br>For specific content, refer to the part "certificate plaintext" |
| Signature data | 64 | BIN | A publisher signs a MD5 value of a certificate plaintext signature by using a 256-bit SM2 private key.<br>For descriptions of an SM2 algorithm, refer to <Announcement No. 21 of the State Cryptography Administration> |
| Total | Variable | | |

The certificate plaintext is shown in Table 8:

TABLE 8

| Content | Length (byte) | Type | Description |
|---|---|---|---|
| Identification code | 3 | Character | Fixed "YKT"<br>Used for screening out other quick response codes |
| Certificate version | 1 | BCD | Certificate application version<br>Corresponding to a terminal rule version<br>A current version is 01 |
| UIID | 3 | BCD | Certificate issuer identifier<br>First and second bits: Industry type<br>00: Urban One-Card<br>01: Bank<br>02: Third-party payment<br>Third to sixth bits: Sequence number<br>The industry of the urban One-Card is a city code, and 0 is complemented when a number of bits is less than 4 |
| User ID | 8 | BCD | ID number for identifying a user identity<br>Unique for a single certificate issuer |
| Certificate issue time | 4 | HEX | UNIX time value |
| Certificate expiration time | 4 | HEX | Unit: 30 minutes |
| Quick response code expiration time | 1 | HEX | Unit: minute |
| Key version | 1 | HEX | |
| Application range | 2 | HEX | 16 bits in total<br>0: Unauthorized<br>1: Authorized<br>First bit: Bus<br>Second bit: Subway<br>Third bit: Vegetable market<br>Fourth bit: Small-sized shop<br>Fifth bit: Supermarket<br>Sixth bit: Economical fast food<br>Seventh bit: Catering<br>Eighth bit: Vending machine<br>Ninth to $16^{th}$ bits: Reserved |
| Single overdraft limit | 2 | HEX | Unit: Yuan |
| Publisher data length | 2 | HEX | |
| Publisher data | | | |

(4) Timestamp authentication data, as shown in Table 9:

TABLE 9

| Content | Length (byte) | Type | Description |
|---|---|---|---|
| Timestamp | 7 | BCD | YYYYMMDDDDhhmmss |
| MAC | 4 | BIN | Level-1 diversification is performed on the latter five bytes of a UIID + a user ID by using a timestamp master key, and then level-2 diversification is performed on a certificate issue date + a certificate expiration date, to obtain a diversified authentication key; four bytes of the certificate issue date + four bytes of a timestamp are encrypted by using the diversified authentication key, to select the latter four bytes |

(5) Transaction authentication code (TAC), as shown in Table 10:

TABLE 10

| TAG | 4 | BIN | Four bytes of a certificate issue dale + four bytes of a timestamp are encrypted by using a TAC key to select the latter four bytes |
|---|---|---|---|

2. Transportation Code Identification and Authentication Mechanism

A gate needs to identify a transportation code through code scanning and authenticate the transportation code. The authentication includes authentication of information such as timestamp information, certificate signature information, and a user identity. An account issuer refers to a background server, a terminal operator may be a card corporation, a subway/bus corporation, or a third-party serving corporation in each region, a terminal refers to a gate machine, and a mobile phone refers to a QQ APP. A specific authentication mechanism is shown in FIG. 5.

3. Logic of Offline Authentication

Figure 7:
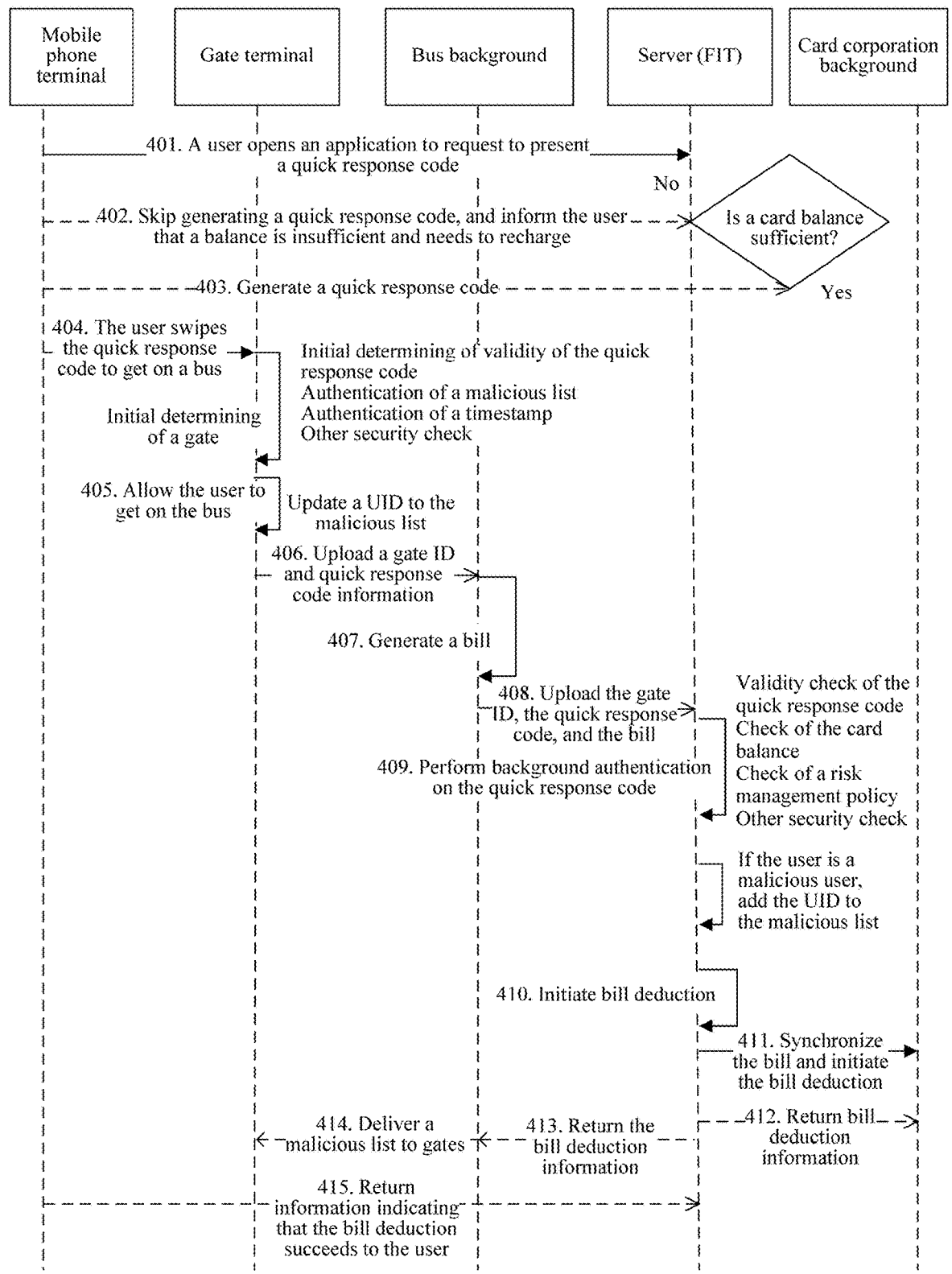
FIG. 7 is a schematic flowchart of a bus travel scenario according to an embodiment of the present invention.

Logic 700 of gate authentication and interpretation of a transportation code and a procedure of delayed authentication of background are shown in FIG. 7. The following steps are included:

Step 401: A user opens an application to request to present a quick response code.

Step 402: Skip generating a quick response code when a card balance is insufficient, and inform the user that the balance is insufficient and needs to recharge.

Step 403: Generate a quick response code.

Step 404: The user swipes the quick response code to get on a bus.

Authentication performed when the quick response code is swiped to get on the bus herein includes: initial determining of validity of the quick response code, authentication of a malicious list, authentication of a timestamp, other security check, and the like.

Step 405: Allow the user to get on the bus, and then update a UID to a malicious list.

Step 406 and step 307: Upload a gate ID and quick response code information, and generate a bill.

Step 408: Upload the gate ID, the quick response code, and the bill.

Step 409: Perform background authentication on the quick response code.

The authentication herein includes: validity check of the quick response code, check of the card balance, check of a risk management policy, other security check, and the like. If the user is a malicious user, the UID is also added to the malicious list.

Step 410: Initiate bill deduction.

Step 411: Synchronize the bill and initiate the bill deduction.

Step 412 to step 415: Return bill deduction information, deliver the malicious list to gates, and return information indicating that the bill deduction succeeds to the user.

In the application scenario, for a check mechanism of the gate, the gate is offline when determining whether the user passes through, but needs to perform delayed networking after allowing the user to pass through, to upload user data and the gate ID to subway/bus background and then to the background server for data check and parsing.

In the application scenario, the gate is required to be offline during determining. Therefore, a malicious blacklist mechanism is introduced. For the malicious blacklist, when detecting that a user is a malicious user or may maliciously propagate a transportation code, the background server adds a UID of the user to the malicious list, delivers the malicious list to all gates, and no longer generates a transportation code for the user. The malicious blacklist effectively avoids a risk that the quick response code is massively repeated and gate entering is repeatedly performed, and effectively avoids a risk that a malicious user thieves or distributes a transportation code, thereby ensuring cash security of the user.

In the application scenario, there is no concept of exiting from a gate for a bus, and the blacklist stores two types of codes: (1) the transportation code, where a transportation code used by a user needs to be added to the blacklist to avoid repeated use and replication, the blacklist is delivered to all gates by using bus background or the background server, and data existing more than a time (for example, two hours) is cleared; and (2) a UID, where when detecting that transaction of the user is abnormal, for example, transaction is performed for a plurality of times in a short time, the background server delivers the UID of the user to the blacklist, the user is not allowed to pass through by using all quick response codes having been generated, and no new quick response code is generated.

In the application scenario, as the user enters a gate, a bill deduction operation may be initiated after the background server determines that the quick response code is authorized.

In the application scenario, check of the background server is determining of validity of a payment request that is performed after the server receives the user quick response code data and the gate ID from the bus, and includes the following:

(1) integrity determining of the payment request, to determine whether all necessary information is included;

(2) whether a merchant is authorized;

(3) whether merchant information and purchaser information are correct;

(4) whether an order status has been closed or paid;

(5) whether the quick response code is a transportation code for subway/bus payment;

(6) whether the quick response code has expired;

(7) whether the account balance of the user is sufficient;

(8) determining of the gate ID information;

(9) determining of risk management information, mainly including a quantity of times and a limit of one-day consumption, an anti-fraud policy, and whether password verification is required; and

(10) the server maintains the gate malicious blacklist mechanism, determines validity of the user the quick response code data, initiates a bill deduction request, and pushes a related QQ message.

In the application scenario, during processing of an exception, a risk that the transportation code is massively replicated needs to be avoided. The transportation code is essentially a quick response code, and is easier to be replicated and propagated than a NFC. In addition, during offline authentication, if the transportation code is massively replicated, a serious consequence may be caused. For this case, the following measures are taken in this solution:

(1) Timestamp authentication: The transportation code includes timestamp information, and the gate first performs initial determining. If the transportation code is generated one minute ago, pass-through is rejected.

(2) Threshold entry background server review: If detecting that a user has lots of gate entering records (≥ three times) within a short time, for example, within 10 minutes, the background server adds a UID of the user to the malicious blacklist, delivers the malicious blacklist to all gates, and stops generating a new transportation code for the user.

In the application scenario, during processing of an exception, a risk that a user uses a transportation code for a plurality of times within a short time in a bus environment needs to be avoided. In the bus environment, a user may frequently take a bus within a short time. When a quantity of times is greater than a value, it may be considered that the user performs unauthorized transaction. In this case, policies are required:

(1) Gate malicious list mechanism: A code having been swiped by the user is added to the blacklist, the blacklist is regularly cleaned after two hours, and timestamp authentication performed by the gate on a code existing more than one minute cannot succeed.

(2) Determining of an unauthorized user: If a user takes a bus by swiping a code for four or more times within 10 minutes and for six or more times within an hour (temporally), it is considered that an account of the user is risky, a UID of the user is added to the blacklist, and a new transportation code stops being generated. Assessment and processing of risk management waits to be performed.

In the application scenario, during processing of an exception, a risk that a user stops using a transportation code before bill deduction needs to be avoided. When a user selects to stop using a transportation code before bill deduction in a route or after exiting from a station, a prompt needs to be popped up to indicate that use of the transportation code can be stopped only after the bill deduction succeeds and settlement is completed.

In the application scenario, during processing of an exception, a risk that an account balance of a user is insufficient to pay for travel needs to be avoided. There is a case in which a user finds out that an account balance is sufficient to pay for a route after the route is completed. For this case, the following method is used:

(1) Confirmation in advance: If it is found out that the balance of the user is insufficient to complete the longest route, the user is not allowed to present a transportation code and is prompted to recharge.

(2) Collection: A manner such as push of a QQ message for collection, association with Tencent credit or bank credit, or bill deduction performed on a bound bank card of the user is used for collection of arrears of the user.

(3) Collection mode: If the user has no arrears, a transportation code is presented to the user. If having arrears in a route, the user needs to recharge before next use, otherwise, no transportation code is presented. A disbursement or bad debt risk may be caused, and a bank or an insurance company needs to be introduced for saving.

In the application scenario, during processing of an exception, a risk that a transportation code generation mechanism is cracked needs to be avoided. There is a risk that a transportation code generation mechanism is cracked and used by an ill-intentioned person. For this case, a policy is: (1) Introduction of asymmetric encryption: The transportation code is encrypted by using an asymmetric encryption mechanism, a private key is in the background server, and a public key is in a gate. In addition, regular update (24 hours) may be performed as required. In this way, a risk that a quick response code is cracked is maximally avoided. (2) Malicious list mechanism: If detecting that a quick response code is forged, the background server adds the UID to the malicious list.

In the application scenario, according to this embodiment of the present invention, a user can take a bus or subway by using any mobile phone, and this embodiment of the present invention is applicable to mobile phones of all models and mechanisms. The user can quickly and conveniently pass through a subway/bus gate by using a transportation code, which is consistent with experience of passing through a gate by using a physical One-Card (NFC); operation costs of cards, the subway corporation, and the bus corporation are reduced; it is greatly convenient for the user to apply for a transportation card into a mobile phone anytime and anywhere without lining up for purchase, and deposit is not required; the QQ wallet is used as a payment channel of the user, and therefore cash is secure and a settlement procedure is clear; digital construction is implemented, and travel data of the user is collected with big data, to help a related department to properly configure resources, so that configuration of transportation resources is more proper and travel is quicker and more convenient. In addition to the foregoing double offline solution, a semi-offline solution may alternatively be used. That is, when a network connection is available, a manner in which a gate performs online authentication in real time may be used, and quick and secure authentication of the gate can also be implemented. A solution of credit payment saving may alternatively be used. That is, a mode in which a gate does not need to perform excessive security authentication, and only needs to extract UID information of user after scanning and subsequently gather bill deduction is used. Credit endorsement of the user is required herein.

In the several embodiments provided in this application, it should be understood that the disclosed apparatus and method may be implemented in other manners. The described device embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to a plurality of network units. Some or all of the units need to be selected according to actual requirements to implement the purpose of the solution of the embodiments.

In addition, in the embodiments of the present invention, the functional units may be all integrated into a processing unit. Alternatively, the units may be respectively used as a unit. Alternatively, two or more units may be integrated into a unit. The integrated unit may be implemented in a hardware form, or may be implemented in a form of adding hardware and a software functional unit.

A person of ordinary skill in the art may understand that, some or all of steps for implementing the method embodiments may be implemented by using a program instructing related hardware. The program may be stored in a computer readable storage medium. When the program is executed, the steps including the method embodiments are performed. The storage medium includes various types of media that may store program code, for example, a mobile storage device, a read-only memory (ROM), a random access memory (RAM), a magnetic disk, or an optical disk.

Alternatively, when the integrated unit in the present disclosure is implemented in the form of a software function unit and sold or used as an independent product, the integrated unit may be stored in a computer readable medium. Based on such an understanding, the technical solutions of the embodiments of the present invention essentially, or the part contributing to the existing technology may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: a medium such as a mobile storage device, a ROM, a RAM, a disc, or a compact disc that can store program code.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present invention shall be subject to the protection scope of the claims.

INDUSTRIAL PRACTICABILITY

According to the embodiments of the present invention, a ticket virtualization technology benefits all people, an application range is wide, an original intention of a commonality design satisfies user requirements, and post-extension and post-development are facilitated. Even though networking is poor, for example, there is no network or a network condition is poor, authentication can also be implemented. According to offline authentication in the embodiments of the present invention, users do not need to get stuck and line up massively during fluctuation of the network condition even if the network condition is poor. This is a mechanism for quickly implementing authentication.

What is claimed is:

1. An information identification code-based information authentication method, implemented by a second terminal, the second terminal comprising one or more processors, a memory, and one or more programs, the one or more programs being stored in the memory, the program comprising one or more modules each corresponding to a set of instructions, the one or more processors being configured to execute the instructions, and the method comprising:
   parsing an information identification code in response to a first request, received from a first terminal, to obtain a first identifier and a second identifier;
   performing comparison authentication on the first identifier by matching the first identifier to at least one identifier in a preset information check library stored locally in the second terminal to determine a user identity;
   performing comparison authentication on the second identifier by using a current time of the second terminal, and if a time difference falls within a preset time range, determining that the comparison authentication succeeds, accepting the first request received from the first terminal, and opening a gate; and
   encapsulating, after opening the gate, a third identifier representing an identity of the second terminal and the information identification code comprising the first identifier and the second identifier into a second request, and sending the second request to a server,
   wherein the second request requests the server to perform, after opening the gate, validity authentication according to the second request and then to perform processing related to a target requirement.

2. The method according to claim 1, further comprising:
   encrypting the information identification code by using a private key, to obtain an encrypted information identification code, and
   wherein the parsing the information identification code in response to the first request to obtain the first identifier and the second identifier comprises:
      decrypting, in response to the first request, the encrypted information identification code by using a public key according to an asymmetric encryption and decryption policy, and parsing the information identification code to obtain the first identifier and the second identifier.

3. The method according to claim 1,
   wherein when the first terminal requests the second terminal to perform identity authentication on the first terminal to satisfy the target requirement and the target requirement is subway travel, the second terminal receives a gate-entering request received from the first terminal according to the information identification code; and
   wherein performing comparison authentication on the first identifier by using a locally-stored preset information check library to determine a user identity comprises:
      rejecting, if the first identifier is in a malicious number library, the gate-entering request received from the first terminal;
      rejecting, if the first identifier is in a gate-entering blacklist, the gate-entering request received from the first terminal; or accepting, if the first identifier is neither in the malicious number library nor in the gate-entering blacklist, the gate-entering request received from the first terminal, and adding the first identifier to the gate-entering blacklist.

4. The method according to claim 3, further comprising:
receiving, after the server pushes to the first terminal, information indicating that the first terminal has entered a gate, a gate-exiting request received from the first terminal according to the information identification code;
parsing the gate-exiting request in response to the gate-exiting request to obtain the first identifier and the second identifier; and
when the second terminal performs comparison authentication on the first identifier by using the locally-stored preset information check library to determine the user identity:
rejecting, if the first identifier is in the malicious number library, the gate-exiting request received from the first terminal;
rejecting, if the first identifier is not in a gate-exiting whitelist, the gate-exiting request received from the first terminal; or
performing, if the first identifier is in the gate-exiting whitelist, comparison authentication on the second identifier by using the current time of the second terminal, and if the time difference falls within the preset time range, determining that the comparison authentication succeeds and accepting the gate-exiting request received from the first terminal, and deleting the first identifier from the gate-exiting whitelist.

5. The method according to claim 4, wherein a pushing of the information indicating that the first terminal has entered the gate is triggered after the server parses the second request to obtain the third identifier and the information identification code comprising the first identifier and the second identifier and performs validity check on the information identification code.

6. The method according to claim 5, further comprising:
encapsulating the third identifier representing the identity of the second terminal, the information identification code comprising the first identifier and the second identifier, and bill information obtained according to the gate-entering request and the gate-exiting request into a third request; and
sending the third request to the server,
wherein the third request requests the server to parse the third request to obtain the third identifier, the information identification code, and the bill information, and to perform a validity check on the information identification code, and then initiate a payment request according to the bill information to complete payment processing related to the subway travel.

7. The method according to claim 1,
wherein when the first terminal requests the second terminal to perform identity authentication on the first terminal to satisfy the target requirement and the target requirement is bus travel, the second terminal receives a ride request received from the first terminal according to the information identification code; and
wherein performing comparison authentication on the first identifier by using a locally-stored preset information check library to determine a user identity comprises:

rejecting, if the first identifier is in a malicious number library, the ride request received from the first terminal; or
accepting, if the first identifier is not in the malicious number library, the ride request received from the first terminal, and adding the first identifier to a malicious number blacklist.

8. The method according to claim 7, further comprising:
encapsulating the third identifier representing the identity of the second terminal, the information identification code comprising the first identifier and the second identifier, and bill information obtained according to the ride request into the second request; and
sending the second request to the server,
wherein the second request requests the server to parse the second request to obtain the third identifier, the information identification code, and the bill information, and to perform a validity check on the information identification code, and then initiate a payment request according to the bill information to complete payment processing related to the bus travel.

9. The method according to claim 1, further comprising:
receiving the first request from the first terminal at a first time,
wherein the first terminal is disconnected from the internet at the first time.

10. The method according to claim 1, further comprising:
opening a physical gate of the second terminal both in response to determining that the comparison authentication succeeds and before the server performs the validity authentication,
wherein the physical gate is at least one of an entrance to or an exit from a subway.

11. A second terminal, comprising:
at least one memory configured to store computer program code; and
at least one processor configured to access the at least one memory and operate according to the computer program code, the computer program code comprising:
request response unit code configured to cause the at least one processor to parse an information identification code in response to a first request, received from a first terminal, to obtain a first identifier and a second identifier;
authentication unit code configured to cause the at least one processor to:
perform comparison authentication on the first identifier by matching the first identifier to at least one identifier in a preset information check library stored locally in the second terminal to determine a user identity;
perform comparison authentication on the second identifier by using a current time of the second terminal, and
if a time difference falls within a preset time range, determine that the comparison authentication succeeds, accept the first request received from the first terminal, and open a gate; and
request sending unit code configured to cause the at least one processor to encapsulate, after opening the gate, a third identifier representing an identity of the second terminal and the information identification code comprising the first identifier and the second identifier into a second request, and send the second request to a server, wherein the second request requests the server to perform, after opening the gate, validity authentication according to the second request and then to perform processing related to a target requirement.

12. The second terminal according to claim 11, wherein the request response unit code is further configured to:
decrypt, after the information identification code is encrypted by using a private key to obtain an encrypted information identification code, the encrypted information identification code by using a public key according to an asymmetric encryption and decryption policy, and parse the information identification code to obtain the first identifier and the second identifier.

13. The second terminal according to claim 11, wherein the computer program code further comprises:
receiving unit code configured to cause the at least one processor to receive, when the first terminal requests the second terminal to perform identity authentication on the first terminal to satisfy the target requirement and the target requirement is subway travel, a gate-entering request received from the first terminal according to the information identification code; and
the authentication unit code is further configured to cause the at least one processor to:
reject, if the first identifier is in a malicious number library, the gate-entering request received from the first terminal;
reject, if the first identifier is in a gate-entering blacklist, the gate-entering request received from the first terminal; or
accept, if the first identifier is neither in the malicious number library nor in the gate-entering blacklist, the gate-entering request received from the first terminal, and add the first identifier to the gate-entering blacklist.

14. The second terminal according to claim 13, wherein the receiving unit code is further configured to cause the at least one processor to receive, after the server pushes to the first terminal, information indicating that the first has entered a gate and a gate-exiting request received from the first terminal according to the information identification code;
the request response unit code is further configured to cause the at least one processor to parse the gate-exiting request in response to the gate-exiting request to obtain the first identifier and the second identifier; and
the authentication unit code is further configured to cause the at least one processor to:
when performing comparison authentication on the first identifier by using the locally-stored preset information check library to determine the user identity, reject, if the first identifier is in the malicious number library, the gate-exiting request received from the first terminal;
reject, if the first identifier is not in a gate-exiting whitelist, the gate-exiting request received from the first terminal; or
perform, if the first identifier is in the gate-exiting whitelist, comparison authentication on the second identifier by using the current time of the second terminal, and if the time difference falls within the preset time range, determine that the comparison authentication succeeds and accept the gate-exiting request received from the first terminal, and delete the first identifier from the gate-exiting whitelist.

15. The second terminal according to claim 14, wherein the request sending unit code is further configured to cause the at least one processor to:
encapsulate the third identifier representing the identity of the second terminal, the information identification code comprising the first identifier and the second identifier, and bill information obtained according to the gate-entering request and the gate-exiting request into a third request, and
send the third request to the server,
wherein the third request requests the server to parse the third request to obtain the third identifier, the information identification code, and the bill information, to perform validity check on the information identification code, and then to initiate a payment request according to the bill information to complete payment processing related to the subway travel.

16. The second terminal according to claim 11, wherein the computer program code further comprises:
receiving unit code configured to cause the at least one processor to receive, when the first terminal requests the second terminal to perform identity authentication on the first terminal to satisfy the target requirement and the target requirement is bus travel, a ride request received from the first terminal according to the information identification code; and
the authentication unit code is further configured to cause the at least one processor to:
reject, if the first identifier is in a malicious number library, the ride request received from the first terminal; or
accept, if the first identifier is not in the malicious number library, the ride request received from the first terminal, and add the first identifier to a malicious number blacklist.

17. The second terminal according to claim 16, wherein the request sending unit code is further configured to cause the at least one processor to:
encapsulate the third identifier representing the identity of the second terminal, the information identification code comprising the first identifier and the second identifier, and bill information obtained according to the ride request into the second request,
send the second request to the server,
wherein the second request requests the server to parse the second request to obtain the third identifier, the information identification code, and the bill information, to perform a validity check on the information identification code, and then to initiate a payment request according to the bill information to complete payment processing related to the bus travel.

18. The second terminal according to claim 11, wherein the request response unit code is further configured to receive the first request from the first terminal at a first time,
wherein the first terminal is disconnected from the internet at the first time.

19. The second terminal according to claim 11, further comprising:
a physical gate which is an at least one of an entrance to or an exit from a subway,
wherein the computer code further comprises gate opening code configured to cause to the at least one processor to open the physical gate both in response to determining that the comparison authentication succeeds and before the server performs the validity authentication.

20. A non-transitory computer-readable computer storage medium, storing an computer executable instruction, and the computer executable instruction instructing performance of an information identification code-based information authentication method implemented by a second terminal, the second terminal comprising one or more processors, a memory, and one or more programs, the one or more programs being stored in the memory, the program comprising one or more modules each corresponding to a set of instructions, the one or more processors being configured to execute the instructions, and the method comprising:

parsing an information identification code in response to a first request, received from a first terminal, to obtain a first identifier and a second identifier;

performing comparison authentication on the first identifier by matching the first identifier to at least one identifier in a preset information check library stored locally in the second terminal to determine a user identity;

performing comparison authentication on the second identifier by using a current time of the second terminal, and if a time difference falls within a preset time range, determining that the comparison authentication succeeds, accepting the first request received from the first terminal, and opening a gate; and encapsulating, after opening the gate, a third identifier representing an identity of the second terminal and the information identification code comprising the first identifier and the second identifier into a second request, and sending the second request to a server, wherein the second request requests the server to perform, after opening the gate, validity authentication according to the second request and then to perform processing related to a target requirement.

* * * * *